(12) United States Patent
Reynolds et al.

(10) Patent No.: US 9,012,600 B2
(45) Date of Patent: Apr. 21, 2015

(54) SYNTHESIS OF DIOXYHETEROCYCLE-BASED POLYMERS

(71) Applicant: University of Florida Research Foundation, Inc., Gainesville, FL (US)

(72) Inventors: John R. Reynolds, Dunwoody, GA (US); Frank Antonio Arroyave-Mondragon, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 95 days.

(21) Appl. No.: 13/765,810

(22) Filed: Feb. 13, 2013

(65) Prior Publication Data

US 2013/0217801 A1 Aug. 22, 2013

Related U.S. Application Data

(60) Provisional application No. 61/597,949, filed on Feb. 13, 2012.

(51) Int. Cl.
| | |
|---|---|
| *C08G 65/20* | (2006.01) |
| *C08G 75/06* | (2006.01) |
| *C08G 73/06* | (2006.01) |

(Continued)

(52) U.S. Cl.
CPC ............ *C08G 75/06* (2013.01); *C08G 73/0672* (2013.01); *C08G 61/124* (2013.01); *C08G 61/126* (2013.01); *C08G 2261/124* (2013.01); *C08G 2261/3221* (2013.01); *C08G 2261/3223* (2013.01); *C08G 2261/43* (2013.01)

(58) Field of Classification Search
CPC .......................................................... C08G 65/20
USPC .......................................... 528/425, 422, 423
See application file for complete search history.

(56) References Cited

U.S. PATENT DOCUMENTS

| | | |
|---|---|---|
| 7,649,076 B2 | 1/2010 | Reynolds et al. |
| 7,799,932 B2 | 9/2010 | Reynolds et al. |
| 7,807,758 B2 | 10/2010 | Reynolds et al. |

(Continued)

FOREIGN PATENT DOCUMENTS

| | | |
|---|---|---|
| KR | 10-2004-0070181 | 8/2004 |
| KR | 10-2008-0091253 | 10/2008 |
| WO | WO 03-046106 | 6/2003 |

OTHER PUBLICATIONS

Arroyave, F.A. et al., "3,4-Propylenedioxypyrrole-Based Conjugated Oligomers via Pd-Mediated Decarboxylative Cross Coupling," *Organic Letters*, 2010, pp. 1328-1331, vol. 12, No. 6.

(Continued)

*Primary Examiner* — Duc Truong
(74) *Attorney, Agent, or Firm* — Saliwanchik, Lloyd & Eisenschenk

(57) ABSTRACT

A method of polymerization for the preparation of conjugated polymers and copolymers comprising dioxypyrrole and/or dioxyfuran repeating units involves the halogen, N-haloimide, or N-haloamine promoted polymerization of monomers and/or oligomers comprising one or more dioxypyrrole and/or dioxyfuran units. The polymerization can be carried out over a wide range of temperatures and can be carried out with or without a solvent. The monomers allow the preparation of polymers having an oligomeric repeating unit comprising a conjugated unit other than a dioxypyrrole or dioxyfuran that is bound to two dioxypyrrole or dioxyfuran units.

23 Claims, 14 Drawing Sheets

(51) Int. Cl.
*C08G 61/12* (2006.01)
*C08G 65/34* (2006.01)

(56) References Cited

U.S. PATENT DOCUMENTS

| | | |
|---|---|---|
| 2003/0162958 A1 | 8/2003 | Reynolds et al. |
| 2007/0270571 A1 | 11/2007 | Reynolds et al. |
| 2009/0149661 A1 | 6/2009 | Reynolds et al. |
| 2010/0298527 A1 | 11/2010 | Beaujuge et al. |
| 2011/0201777 A1 | 8/2011 | Kondou et al. |

OTHER PUBLICATIONS

Arroyave, F.A., et al., "Synthesis of π-Conjugated Molecules Based on 3,4-Dioxypyrroles via Pd-Mediated Decarboxylative Cross Coupling," *J. Org. Chem.*, 2011, pp. 8621-8628, vol. 76.

Kim, I.T. et al., "New Conducting Polymers Based on Poly(3,4-ethylenedioxypyrrole): Synthesis, Characterization, and Properties," *Chemistry Letters*, 2004, pp. 46-47, vol. 33, No. 1.

Schottland, P. et al., "Poly(3,4-alkylenedioxypyrrole)s: Highly Stable Electronically Conducting and Electronically Conducting Polymers," *Macromolecules*, 2000, pp. 7051-7061, vol. 33.

Sönmez, G. et al., "N-Substituted Poly(3,4-propylenedioxypyrrole)s: High Gap and Low Redox Potential Switching Electroactive and Electrochromic Polymers," *Macromolecules*, 2003, pp. 639-647, vol. 36.

Thomas, C.A. et al., "Poly(3,4-alkylenedioxypyrrole)s as Highly Stable Aqueous-Compatible Conducting Polymers with Biomedical Implications," *Advanced Materials*, 2000, pp. 222-225, vol. 12.

Walczak, R.M. et al., "Poly(3,4-alkylenedioxypyrroles): the PXDOPs as Versatile Yet Underutilized Electroactive and Conducting Polymers," *Advanced Materials*, 2006, pp. 1121-1131, vol. 18.

Walczak, R.M. et al., "3,4-Alkylenedioxypyrrole-Based Conjugated Polymers with Finely Tuned Electronic and Optical Properties via a Flexible and Efficient N-Functionalization Method," *Macromolecules*, 2007, pp. 7777-7785, vol. 40.

Walczak, R.M. et. al., "Processable, Electroactive, and Aqueous Compatible Poly(3,4-alkylenedioxypyrrole)s through a Functionality Tolerant Deiodination Condensation Polymerization," *Macromolecules*, 2008, pp. 691-700, vol. 41.

Zong, K. et. al., "3,4-Alkylenedioxypyrroles: Functionalized Derivatives as Monomers for New Electron-Rich Conducting and Electroactive Polymers," *J. Org. Chem.* 2001, pp. 6873-6882, vol. 66.

SYNTHESIS OF DIOXYHETEROCYCLE-BASED POLYMERS

CROSS-REFERENCE TO RELATED APPLICATION

The present application claims the benefit of U.S. Provisional Application Ser. No. 61/597,949, filed Feb. 13, 2012, which is hereby incorporated by reference herein in its entirety, including any figures, tables, or drawings.

BACKGROUND OF INVENTION

Conjugated conducting polymers displaying moderate charge mobilities, an ability to be redox doped to highly conducting compositions, and an ability to change optical properties reversibly, can be used as color changing materials, conductors, and antistatic coatings in electronic components, photovoltaic devices, and light emitting devices. One class of conducting polymers, polyheterocycles, which include polythiophenes, polypyrroles, and polyfurans, have been developed for their use in electrochromic devices, photovoltaic devices, and light emitting diodes. Appending a 3,4-alkylenedioxy bridge on the heterocycle allows a modified polyheterocycle, where the bridge does not cause an undesirable conformational change in the backbone of the polymer, and the electron donating effect of the oxygen substituents increases the HOMO of the conjugated polymer, reducing both its oxidation potential and its electronic band gap. Poly(3,4-dioxythiophene)s have been extensively studied, poly(3,4-dioxypyrrole)s are somewhat less well known, and poly(3,4-dioxyfuran)s are not well documented.

Poly(3,4-dioxypyrrole)s are materials that display high electronic band gaps and low oxidation potentials, and have properties that make them excellent candidates as sensors, supercapacitors, and electrochromic devices where high conductivity and processability are needed. The syntheses and properties of a wide variety of poly(3,4-dioxypyrrole)s have been reported, for example, in: Walczak et al., *Adv. Mater.* 2006, 18, 1121-31; Schottland et al., *Macromolecules* 2000, 33, 7051-61; Sonmez et al., *Macromolecules* 2003, 36, 639-47; Thomas et al., *Adv. Mater.* 2000, 12, 222-5; and Walczak et al., *Macromolecules* 2007, 40, 7777-85.

More recently, the polymerization of 2,5-diiodo-3,4-alkylenedioxypyrrole in bulk or using a suitable solvent has been disclosed in Reynolds et al., U.S. Pat. No. 7,649,076 and Walczak et al., *Macromolecules* 2008, 41, 691-700. By this method, high molecular weight polymer can be prepared without the use of metals, oxidants, solvents, or other additives. Additionally, reaction can be carried out in aqueous solution and tolerates substitution by a wide variety of functionalities, including those that cannot be synthesized by an oxidative polymerization process. This polymerization, as shown in Scheme 1, requires a three-step synthesis that starts from a 3,4-dioxypyrrole-2,5-diacid and requires isolation and purification of the intermediate 2,5-di-iodo-3,4-dioxypyrrole monomer. However, the isolation and purification steps reduce overall yield and throughput. Furthermore, the polymerization process is limited to the types of 3,4-dioxypyrrole monomers reported in Reynolds et al. Hence, a method that does not require the use of 2,5-di-iodo-3,4-dioxypyrrole and can expand the range of 3,4-dioxypyrrole-based monomers that can be polymerized efficiently is desirable.

BRIEF SUMMARY

Embodiments of the invention are directed to conjugated polymers and methods of their preparation. Conjugated polymers have a multiplicity of 3,4-dialkoy of 3,4-alkylenedioxy pyrrole or furan repeating units. The polymers can also include additional conjugated repeating units that are isolated by 3,4-dialkoy of 3,4-alkylenedioxy pyrrole or furan repeating units. The additional conjugated repeating units include 1,2-ethenediyl, 1,4-butadienediyl, 1,4-benzenediyl, 2,6-naphthalendiyl, 9,10-anthracenediyl, 2,7-fluorenediyl, 2,5-furandiyl, 2,5-thiophenediyl, 2,5-pyrroldiyl, 2,1,3-benzothiadiazole-4,7-diyl, 2,7-carbazolediyl, 2,6-pyridinediyl, 1,4-bis(2',2"-thiophenyl)benzene-5',5"-diyl, and/or 4,7-bis-(2',2"thiophenyl)-2,1,3-benzothiadiazole-5',5"-diyl units. In embodiments of the invention, the end-groups of the conjugated polymers can be a halogen, hydrogen or C(O)OR$^7$, where R$^7$ is hydrogen, lithium, sodium, potassium, cesium, or ammonium. In other embodiments of the invention, the end-groups can have selected functionality.

According to an embodiment of the invention, one or more monomers and/or oligomer that includes a terminal 3,4-dialkoy of 3,4-alkylenedioxy pyrrole or furan substituted at a 2- and/or 5-position with a H, chlorine, bromine, iodine, or C(O)OR$^7$, where R$^7$ is hydrogen, lithium, sodium, potassium, cesium, or ammonium, is polymerized or copolymerized upon addition of a halogen, N-haloimide or N-haloamine. Optionally, an acid can be included. Optionally the polymerization mixture can be irradiated with ultraviolet light. The polymerization can be carried out as the neat monomer(s) and/or oligomer(s) or a solvent can be included. Polymerizing or copolymerizing can be carried out over a wide range of temperatures and can be carried out under mild conditions, for example, 0 to 100° C. End-capping 3,4-dialkoy of 3,4-alkylenedioxy pyrrole or furan monomers can be included, where one substituent is a 2- or 5-H, chlorine, bromine, iodine, or C(O)OR$^7$, where R$^7$ is hydrogen, lithium, sodium, potassium, cesium, or ammonium for incorporation into the polymer or copolymer and another functionality that is designed to provided an additional end-group that can be used to provide functionality for subsequent condensation, addition, or complexation with other monomers, oligomers, polymers, resins, surfaces, salts, or particles to form coupled polymers, block copolymers, multiblock copolymers, networks, aggregates, functionalized resins, functionalized surfaces, or functionalized particles.

BRIEF DESCRIPTION OF DRAWINGS

FIG. 8 shows a $^1$H-NMR spectrum of 6a.

FIG. 9 shows a $^{13}$C-NMR spectrum of 6a.

DETAILED DISCLOSURE

Figure 1:
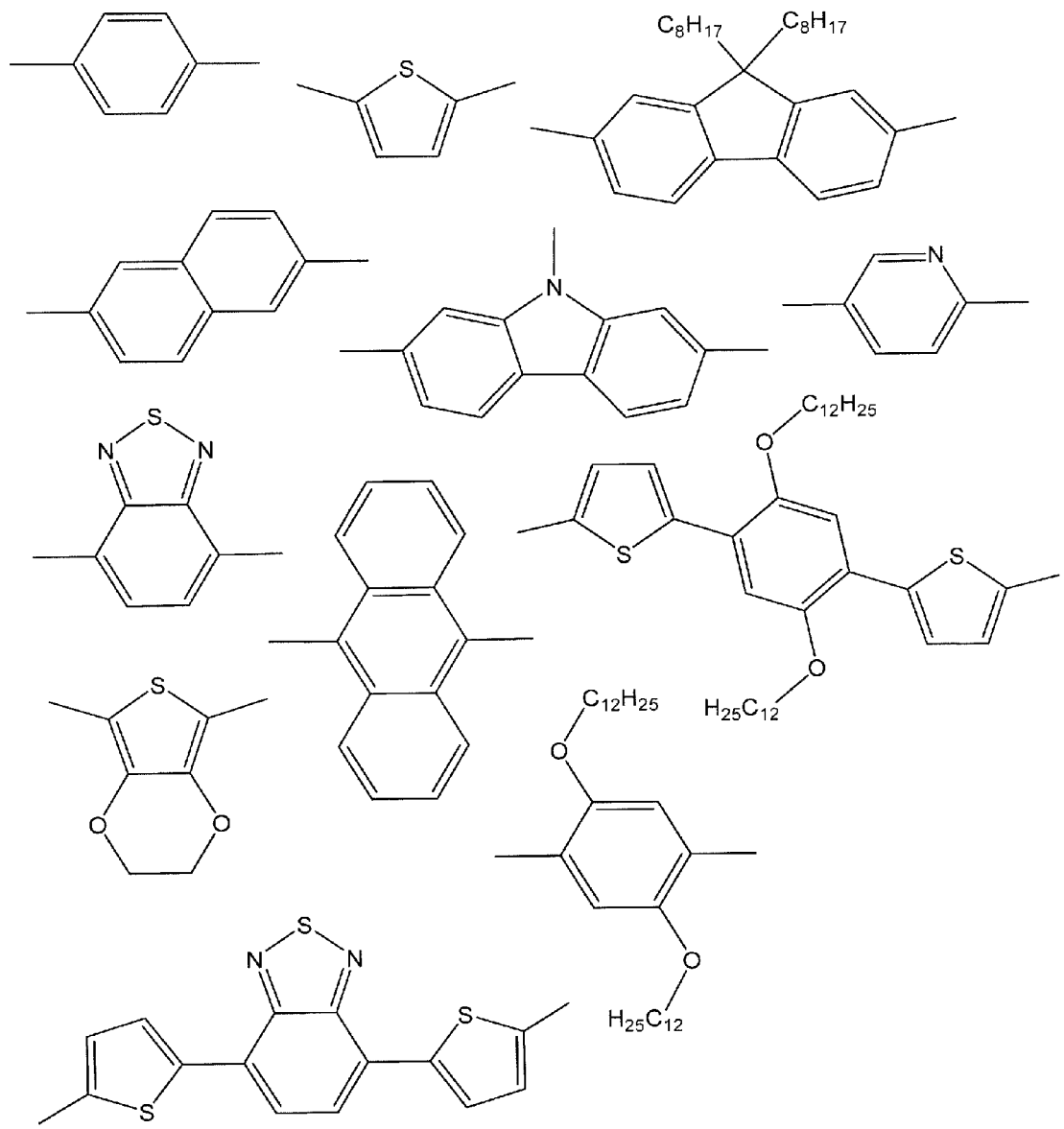
FIG. 1 shows exemplary L groups for oligomeric monomers according to an embodiment of the invention.

An embodiment of the invention is directed to a method for the preparation of a conjugated polymer, where the conjugated polymer is: a poly(dioxypyrrole), either a poly(3,4-dialkyloxypyrrole), poly(3,4-alkylenedioxypyrrole), or poly(3,4-alkylenedioxypyrrole-co-3,4-dialkyloxypyrrole); a poly(dioxyfuran), either a poly(3,4-dialkyloxyfuran), poly(3,4-alkylenedioxyfuran), or poly(3,4-alkylenedioxyfuran-co-3,4-dialkyloxyfuran); or a poly(dioxypyrrole-co-dioxyfuran), either a poly(3,4-alkylenedioxypyrrole-co-3,4-dialkyloxyfuran), a poly(3,4-alkylenedioxyfuran-co-3,4-dialkyloxypyrrole), a poly(3,4-alkylenedioxypyrrole-co-3,4-alkylenedioxyfuran), or poly(3,4-dialkyloxypyrrole-co-3,4-dialkyloxyfuran) via the halogen, N-haloimide, or N-haloamine promoted homopolymerization or copolymerization of monomers comprising 2,5-disubstituted-3,4-dialkyloxypyrrole, 2,5-disubstituted-3,4-alkylenedioxypyrrole, 2,5-disubstituted-3,4-dialkyloxyfuran, 2,5-disubstituted-3,4-alkylenedioxyfuran, any oligomers thereof, or any combination of monomers and oligomers thereof. In an embodiment of the invention, the polymerization involves halogen, N-haloimide, or N-haloamine promoted homopolymerization or copolymerization of: 2,5-disubstituted-3,4-alkylenedioxypyrrole and/or 2,5-disubstituted-3,4-alkylenedioxyfuran comprising monomers or oligomers of the structure:

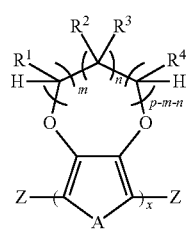

(I)

and/or 2,5-disubstituted-3,4-dialkyloxypyrrole and/or 2,5-disubstituted-3,4-dialkyloxyfuran monomers or oligomers of the structure,

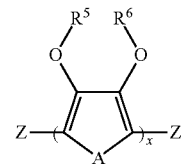

(II)

where: x is 1 to 10; $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; when x is 1, Z is II or C(O)OR$^7$, wherein $R^7$ is hydrogen, lithium, sodium, potassium, cesium, or ammonium where 1 to 4 of the substituents on the ammonium N is H, $C_1$ to $C_8$ alkyl, aryl, or alkyl aryl groups; when x>1, Z is H, chlorine, bromine, iodine, or C(O)OR$^7$; and A is O or NR, wherein R is hydrogen, methyl, ethyl, $C_3$ through $C_{20}$ straight or branched chain alkyl, aryl, alkylaryl, or $CH_2X$ where X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, where Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl. The polymerization can be carried out over a wide range of temperatures, for example, about 20 to about 100° C., and can be carried out in the presence of air or in an inert atmosphere. The polymerization can be carried out in a neat liquid phase, as an amorphous solid, in solution, for example, in dichloromethane (DCM), dibromomethane, or tetrahydrofuran (THF), or in an emulsion of an organic solvent and water. As desired or required, the polymerization mixture can be irradiated with UV radiation or include an acid, for example, a Lewis acid, for example, FeCl$_3$. The resulting homopolymers or copolymers have repeating units that are indicated between the parentheses of structures I and/or II and end-units that comprise chlorine, bromine, or iodine; depending on the halogen, N-haloimide, or N-haloamine, for example, N-halosuccinimide. To achieve high molecular weight homopolymers or copolymers, at least two equivalents of the halogen, N-haloimide, or N-haloamine per mole of monomer or oligomer I and/or II are required.

Another embodiment of the invention is directed to polymers comprising oligomeric bis-dioxypyrrole and/or bis-dioxyfuran repeating units in a homopolymer or copolymer, such that all L units are separated by two or more dioxypyrrole or dioxyfuran units. The oligomeric bis-dioxypyrrole or bis-dioxyfuran repeating units result from polymerization of reaction mixtures that include oligomers of the structures:

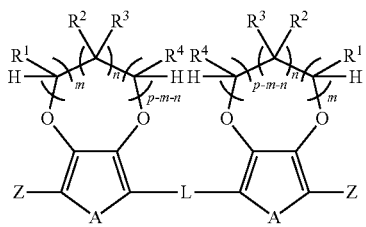

(III)

or

-continued

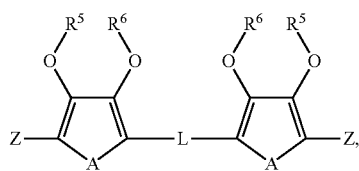

(IV)

where: $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; Z is H, chlorine, bromine, iodine, or $C(O)OR^7$, wherein $R^7$ is hydrogen, lithium, sodium, potassium, cesium, or ammonium, where 1 to 4 of the substituents on the ammonium is to H, $C_1$ to $C_8$ alkyl, aryl, or alkyl aryl groups; A is O or NR, wherein R is hydrogen, methyl, ethyl, $C_3$ through $C_{20}$ straight or branched chain alkyl, aryl, alkylaryl, or $CH_2X$ where X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, where Y is O, OC(O), $NR^{16}$, or $NR^{17}C(O)$, and where $R^9$, $R^{10}$, $R^{11}$, $R^{12}$, $R^{16}$ and $R^{17}$ are independently hydrogen, methyl, ethyl, $C_3$ through $C_8$ straight or branched chain alkyl, aryl, or alkylaryl; and L is 1,2-ethenediyl, 1,4-butadienediyl, 1,4-benzenediyl, 2,6-naphthalendiyl, 9,10-anthracenediyl, 2,7-fluorenediyl, 2,5-furandiyl, 2,5-thiophenediyl, 2,5-pyrroldiyl, 2,1,3-benzothiadiazole-4,7-diyl, 2,7-carbazolediyl, 2,6-pyridinediyl, 1,4-bis(2',2"-thiophenyl)benzene-5',5"-diyl, or 4,7-bis-(2',2"thiophenyl)-2,1,3-benzothiadiazole-5', 5"-diyl that is unsubstituted or substituted. Exemplary L groups are given in FIG. 1.

In an embodiment of the invention L is a substituted 2,5-thiophenediyl having the structure:

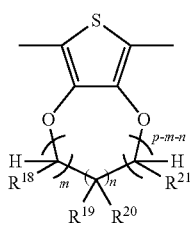

(V)

or

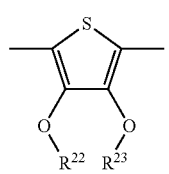

(VI)

where p is 2 through 6, m is 1 through p−1, n is 0 through p−2 and $R^{18}$, $R^{19}$, $R^{20}$, and $R^{21}$ are independently hydrogen, methyl, ethyl, $C_3$ through $C_{20}$ straight or branched chain alkyl, aryl, or alkylaryl; and $R^{22}$ and $R^{23}$ are independently methyl, ethyl, $C_3$ through $C_{20}$ straight or branched chain alkyl, aryl, or alkylaryl.

Examplary trimeric bis-dioxypyrroles, according to embodiments of the invention, include:

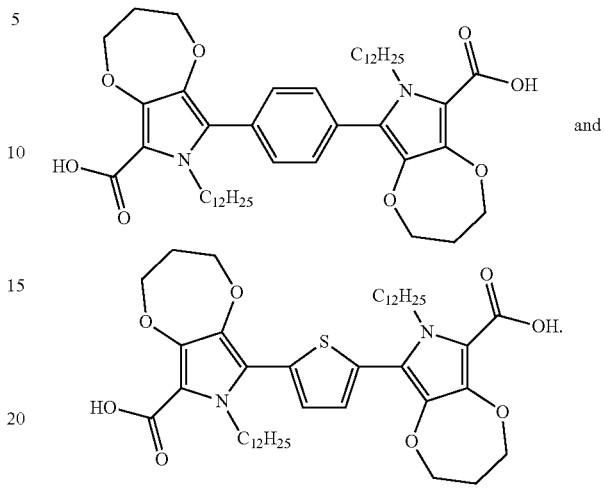

and

In embodiments of the invention, polymers are prepared from the homopolymerization of any trimer or the copolymerization of one or more trimers of the structures III or IV, for example, two or more different trimers of structure III, a trimer of structure III and a trimer of structure IV, or two trimers of the structure IV with a trimer of the structure III, or any other combination. In other embodiments of the invention, polymers are prepared from the copolymerization of one or more trimers of the structures III or IV with one or more dioxypyrrole monomers or oligomers of structures I and II. In an embodiment of the invention, the conjugated polymers have repeating units common with those of structures I, II, III, and/or IV from which they are prepared, and can have endgroups selected from H, $C(O)OR^7$, Cl, Br, and/or I.

In embodiments of the invention, an end-capping monomer of the structure is:

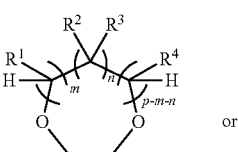

(VII)

or

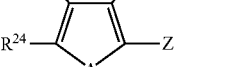

(VIII)

where $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; Z is H, chlorine, bromine, iodine, or $C(O)OR^7$ where $R^7$ is hydrogen, lithium, sodium, potassium, cesium, or ammonium, where 1 to 4 of the substituents on the ammonium is H, $C_1$ to $C_g$ alkyl, aryl, or alkyl aryl groups; A is O or NR, wherein R is hydrogen, methyl, ethyl, $C_3$ through $C_{20}$ straight or branched chain alkyl, aryl, alkylaryl, or $CH_2X$ wherein X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl; and where $R^{24}$ is $C_1$ through $C_8$ alkyl, aryl, alkylaryl, aryl, functional alkyl, functional aryl, or functional alkylaryl group, where the functional alkyl, functional aryl, or functional alkylaryl group have one or more functionalities selected from amines, acrylates, hydroxys, esters, carboxylic acid, thiols, enes, dienes, ynes, and halides.

In an embodiment of the invention, the homopolymers or copolymers prepared from I, II, III, and/or IV, can be employed as macromers for their homopolymerization or their copolymerization with other monomers or oligomers from I, II, III, or IV to form higher molecular weight homopolymers, di- to multiblock copolymers, semi-random copolymers or semi-regular copolymers. In an embodiment of the invention, polymers prepared with one or more of I, II, III, and IV with VII and/or VIII have functionality for condensation, addition, or complexation with other monomers, oligomers, polymers, resins, surfaces, salts, or particles to form coupled polymers, block copolymers, multiblock copolymers, networks, aggregates, functionalized resins, functionalized surfaces, or functionalized particles.

Figure 2:
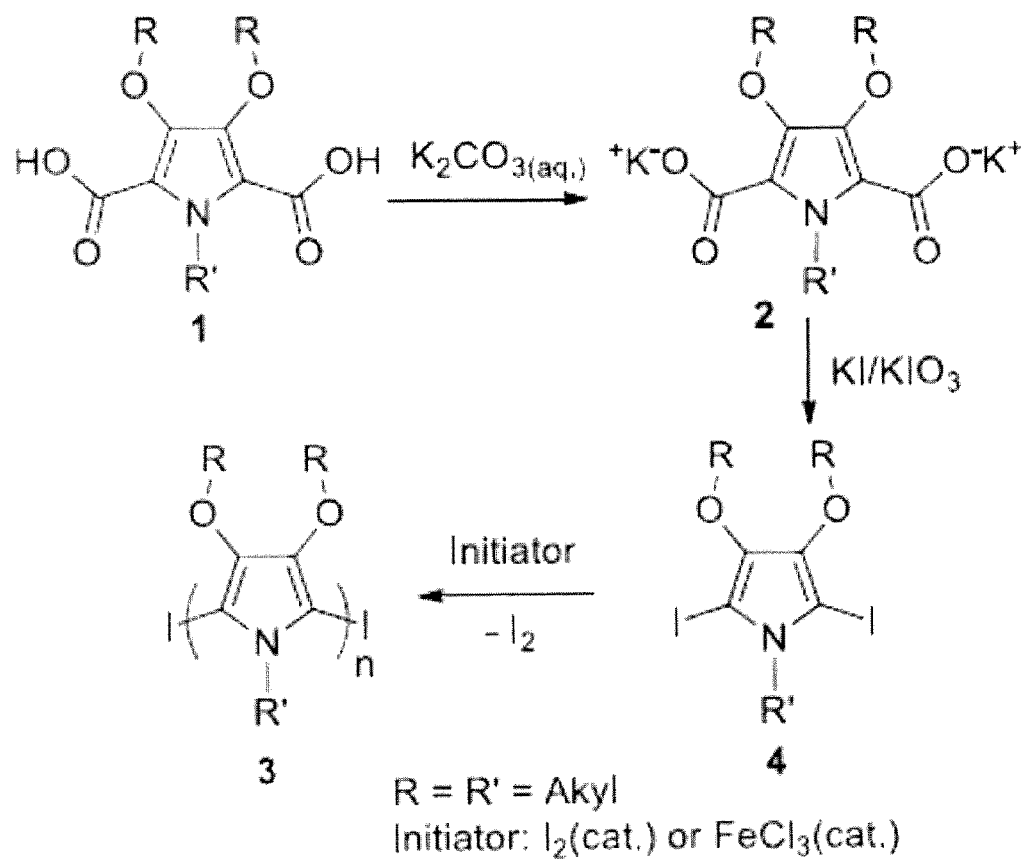
FIG. 2 shows a reaction scheme for the prior art preparation of a poly(3,4-dioxypyrrole) by a three-step process with the isolation of a 2,5-diiodo-3,4-dioxypyrrole.

Reynolds et al., U.S. Pat. No. 7,649,076 teaches the catalyst free polymerization of 2,5-dihalo-3,4-alkylenedioxypyrroles and 2,5-dihalo-3,4-alkylenedioxyfurans. This method involves isolation of the dihalo monomers, in the manner taught by Zong et al. *J. Org. Chem.* 2001, 66, 6873-82, as illustrated in FIG. 2. After isolation, the polymerization is carried out, as indicated in FIG. 2. The polymerization method has been successfully applied for the preparation of homopolymers and copolymers, either block or random copolymers. However, a polycondensation method for production of regioregular copolymers from discrete α,ω-dihalo oligomers does not readily occur. Using the method of Zong et al., it is not possible to prepare α,ω-dihalo oligomers, such as the trimers of structure III where Z is iodine, because a significant amount of decarboxylation of the diacid occurs during the first step of base catalyzed ester hydrolysis to the diacid, which leads to a mixture of products even when the hydrolysis is carried out at relatively low temperatures. Preparation of N-alkyl substituted 3,4-alkylenedioxypyrrole monomers that can be used to prepare polymers, according to embodiments of the present invention, are taught in Reynolds et al., U.S. Pat. No. 7,799,932, and incorporated herein by reference.

Figure 3:
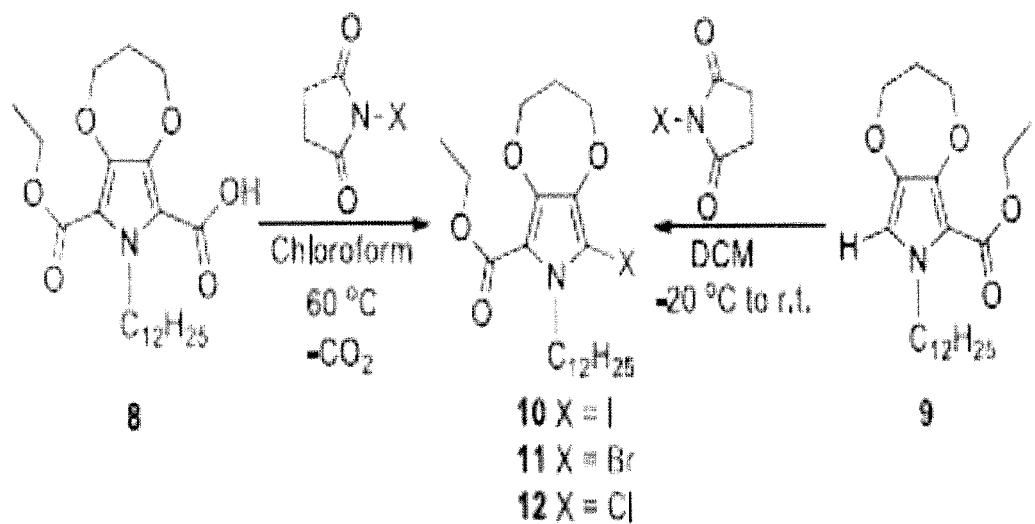
FIG. 3 shows a reaction scheme for the halodecarboxylation of a model 2-carboxylic acid 3,4-propylenedioxypyrrole and a model 2-H 3,4-propylenedioxypyrrole using N-halosuccinimides.
Figure 4:
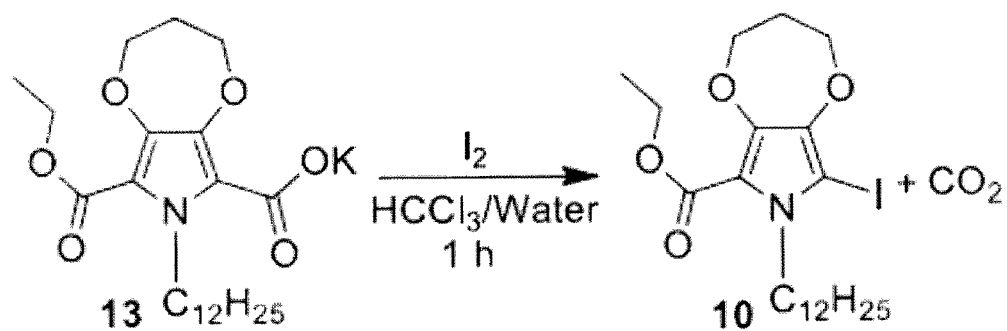
FIG. 4 shows a reaction scheme for the iododecarboxylation of a model 2-potassiun carboxylate 3,4-propylenedioxypyrrole using iodine.
Figure 5:
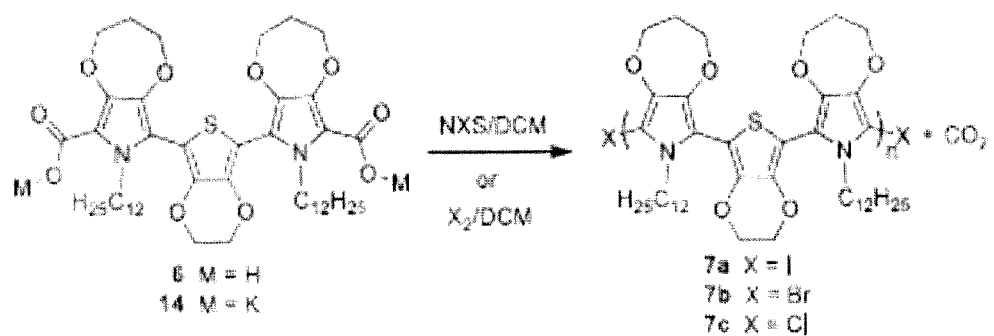
FIG. 5 shows a reaction scheme for the in situ halodecarboxylation-dehalogenation polycondensation of 6 and 14 using various halogens or N-halosuccinimides, according to an embodiment of the invention.

It was discovered that N-halosuccinimides promote electrophilic halogenation of a model 3,4-propylenedioxypyrrole (ProDOP) 9 and halodecarboxylation of a model 3,4-propylenedioxypyrrole carboxylic acid 8, as shown in FIG. 3, and that N-halosuccinimides promote halodecarboxylation of a model 3,4-propylenedioxypyrrole carboxylic acid potassium salt 10, as shown in FIG. 4. While attempting to extend the N-halosuccinimides promoted electrophilic halodecarboxylation to ProDOP-dicarboxylates, either acids or potassium salts, polymerization resulted, according to an embodiment of the invention, and polymerization can be carried out effectively using N-iodosuccinimide (>2 equivalents) or iodine (>2 equivalents) to high molecular weight polymer, as shown in FIG. 5. Results for polymerization of monomeric and trimeric dicarboxylic acids and di(potassium carboxylates) are given in Table 1, below. The polymerization occurs at relatively low temperatures, for example, 40 to 60° C. or below, in dichloromethane (DCM) or chloroform. Potassium carboxylates, such as 14 and 17, have low solubility in DCM and the reaction can be carried out in an emulsion formed with water and DCM. Other solvents, for example THF, can be used.

TABLE 1

Polymerization of various ProDOP-dicarboxylates via halodecarbonylation-dehalogenation polycondensation using various halogen (X) sources

| entry | monomer | X-Source | polymer | Mn/Mw (kDa) | yield[a] (%) |
|---|---|---|---|---|---|
| 1 | 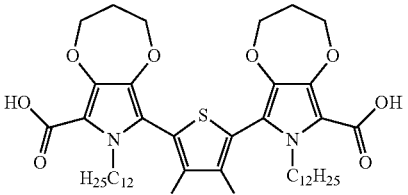 6 | NIS<br>NBS<br>NCS | 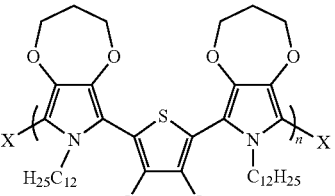 7 | 7a 7.7/13.6<br>7b 66.3/8.9<br>7c 5.0/6.3 | 71[b]<br>83[b]<br>39[b] |
| 2 | 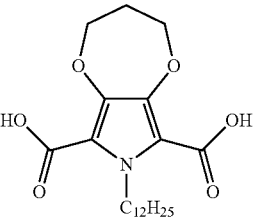 15 | NIS<br>NBS<br>NCS | 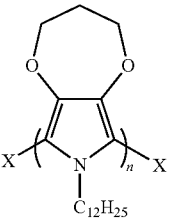 16 | 16a 6.9/17.4<br>16b 0.9/1.1<br>16c 1.1/1.5 | 60<br>76[c]<br>79[c] |

TABLE 1-continued

Polymerization of various ProDOP-dicarboxylates via halodecarbonylation-dehalogenation polycondensation using various halogen (X) sources

| entry | monomer | X-Source | polymer | Mn/Mw (kDa) | yield[a] (%) |
|---|---|---|---|---|---|
| 3 | 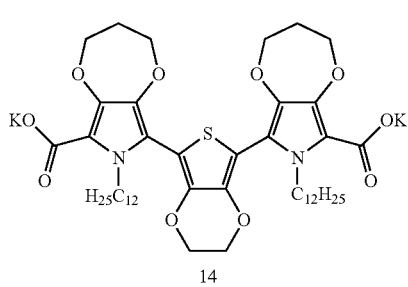 14 | NIS I₂ Br₂ | 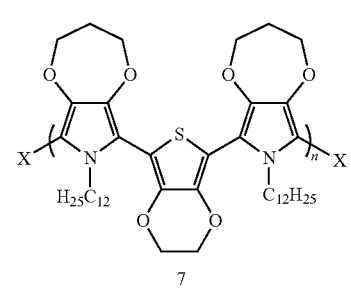 7 | 7a 6.2/10.0<br>7a 22.9/58.1<br>7b 1.3/1.9 | 67<br>66<br>20[c] |
| 4 | 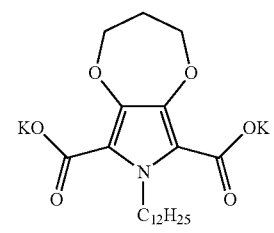 17 | I₂ Br₂ | 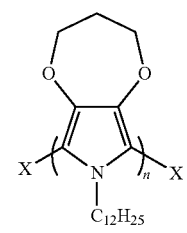 16 | 16a 15.9/35.7<br>16b 0.9/1.9 | 55<br>48 |

[a]The yields were calculated based on the potassium salts except for entry 2, by the method of Walczak et al., *Macromolecules* 2008, 41, 691-700.
[b]The crude mixture was employed after acidic work-up of the respective potassium salt.
[c]The polymer was not precipitated but was washed with water and methanol, and dried under vacuum.

Polymerizations using N-iodosuccinimide (NIS) require longer reaction times than did those using iodine, at otherwise equivalent conditions. N-Chlorosuccinimide (NCS) and N-bromosuccinimide (NBS), and bromine produce lower molecular weight polymers. The polymerization typically starts spontaneously, but, if needed or desired, can be promoted by irradiation with UV-light using a standard UV-lamp, typically requiring only a few minutes of irradiation, for example, 1 to 3 minutes, to promote polymerization. A catalytic amount of $FeCl_3$ can be added to the monomer mixture to promote the polymerization. The polymer that is produced is halogen doped, which can be easily dedoped by the addition of hydrazine.

Figure 6:
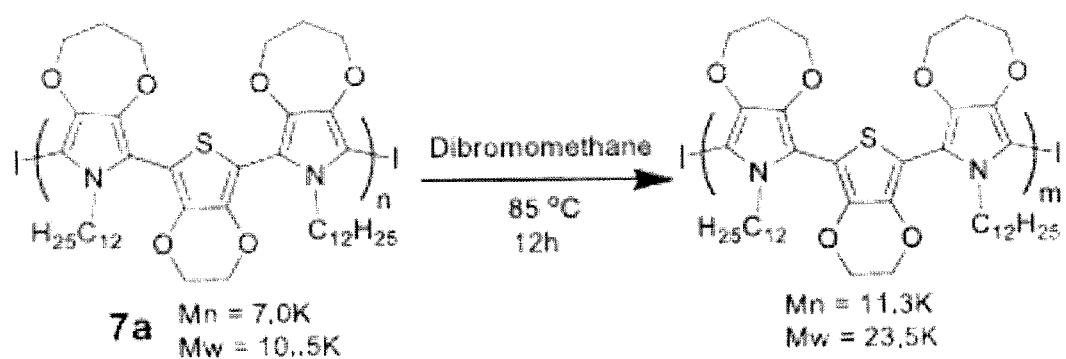
FIG. 6 shows a reaction scheme for the dehalogenation coupling of an α,ω-diiodo conjugated polymer, 7a, to a higher molecular weight conjugated polymer, according to an embodiment of the invention.

Although no specific relationship has been determined between the number of equivalents of halogen from the halogen source and the molecular weight of the polymer, when less than two equivalents of halogen is employed, the resulting molecular weight of the polymer is less than when more than two equivalents are employed. End-groups of the polymer are indicated as X in Table 1, and are halogens or a starting carboxylate groups. Conditions of the polymerization affect the degree of polymerization obtained and allow the use of the oligomers or polymers that are produced in one polymerization to be used as macromers for the formation of larger homopolymers or block copolymers. As shown in FIG. 6, polymer 7a with a molecular weight of about 7 kDa, can be used as a macromer to produce a polymer of 11 kDa. The macromer 7a, as shown in FIG. 6, was prepared in DCM, reduced with hydrazine, precipitated in MeOH, and stored under argon for several months before carrying out its polymerization in dibromomethane, at a temperature in excess of the boiling point of DCM.

Employing N-protonated 2,5-disubstituted-3,4-alkylenedioxypyrroles results in polymers, although generally of lower molecular weight than those of N-alkylated 2,5-disubstituted-3,4-alkylenedioxypyrrole, as indicated in Table 2, below. However, compared to the $FeCl_3$ oxidative polymerization of 3,4-dioxypyrroles, as taught in Kim et al., *Chem. Lett.* 2004, 33, 46-7, a polymerization by any embodiment of the present invention, can provide higher molecular weights and permits polymerizations starting from 3,4-dioxypyrroles carboxylates, which are the normal precursors to unsubstituted 3,4-dioxypyrroles used in $FeCl_3$ oxidative polymerizations. Furthermore, the halodecarbonylation-dehalogenation polycondensation method, according to embodiments of the invention, displays higher tolerance to functionality and lower sensitivity toward water than is observed with other methods for the polymerization of 3,4-dioxypyrroles.

TABLE 2

Polymerization of N—H-3,4-alkydioxypyrroles via halodecarbonylation-dehalogenation polycondensation using NIS and iodine

| monomer | I-Source | polymer | Mn/Mw (kDa) | yield[a] (%) |
|---|---|---|---|---|
| 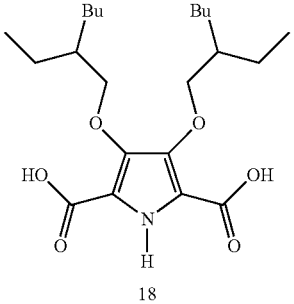 18 | NIS | 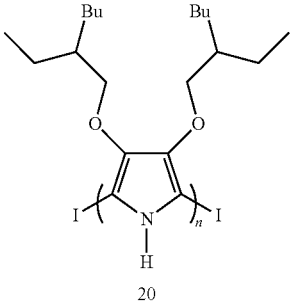 20 | 3.7/5.2 | 31[b] |
| 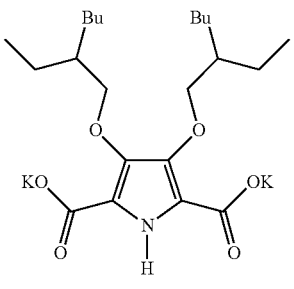 19 | $I_2$ | 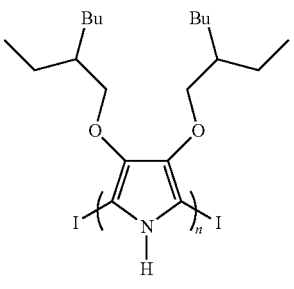 20 | 2.1/2.8 | 36[b] |

[a]Yields were calculated as in Table 1.
[b]Polymer was isolated by removal of the solvent in vacuo, washing with water and methanol, and drying under vacuum.

Figure 7A:
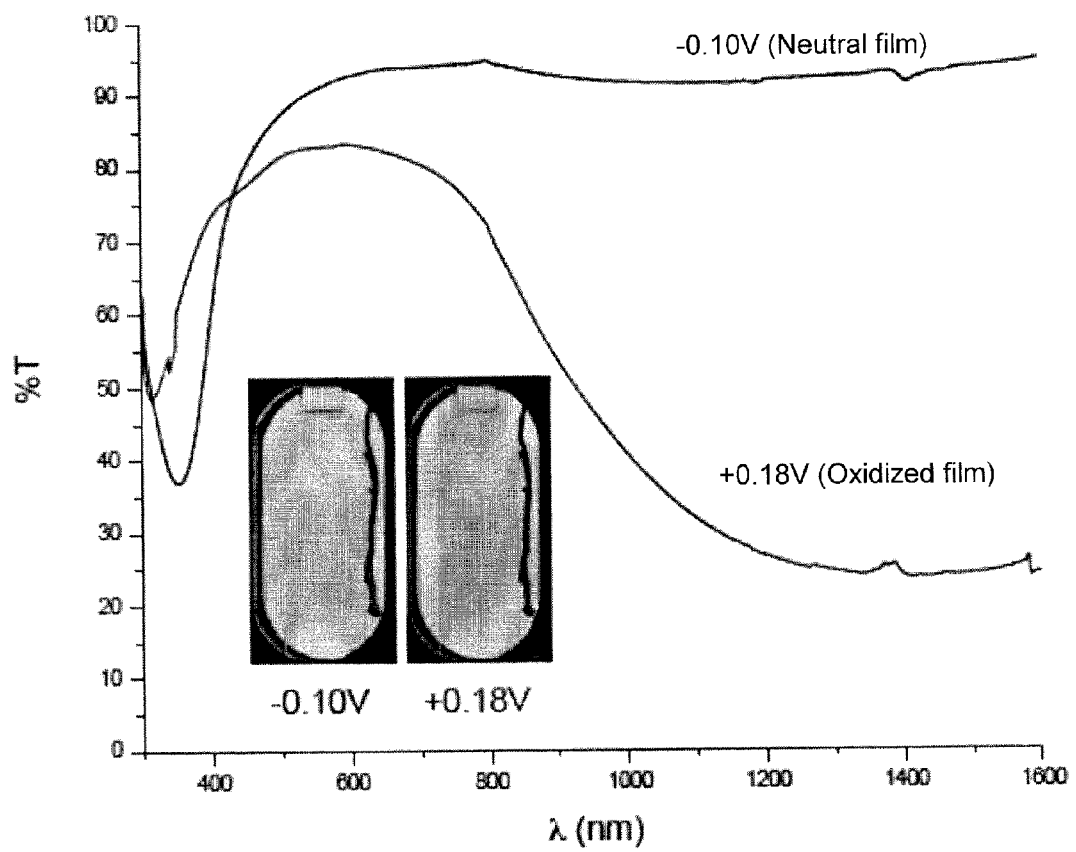
FIG. 7 shows a) electromagnetic absorption spectra for neutral and oxidized spray-cast films of α,ω-diiodo conjugated polymer, 7a, on ITO-coated glass from DCM solution (2 mg/mL); and b) cyclic voltammograms of the 7a where electrochemical oxidation of the film was carried out in TBAPF$_6$ [0.2M]/ACN using a Ag/Ag+ reference electrode and a platinum counter electrode.
Figure 7B:
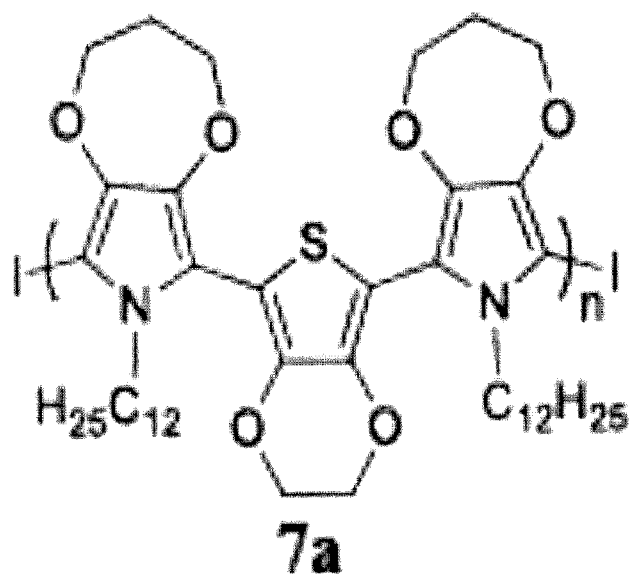
Figure 7B:
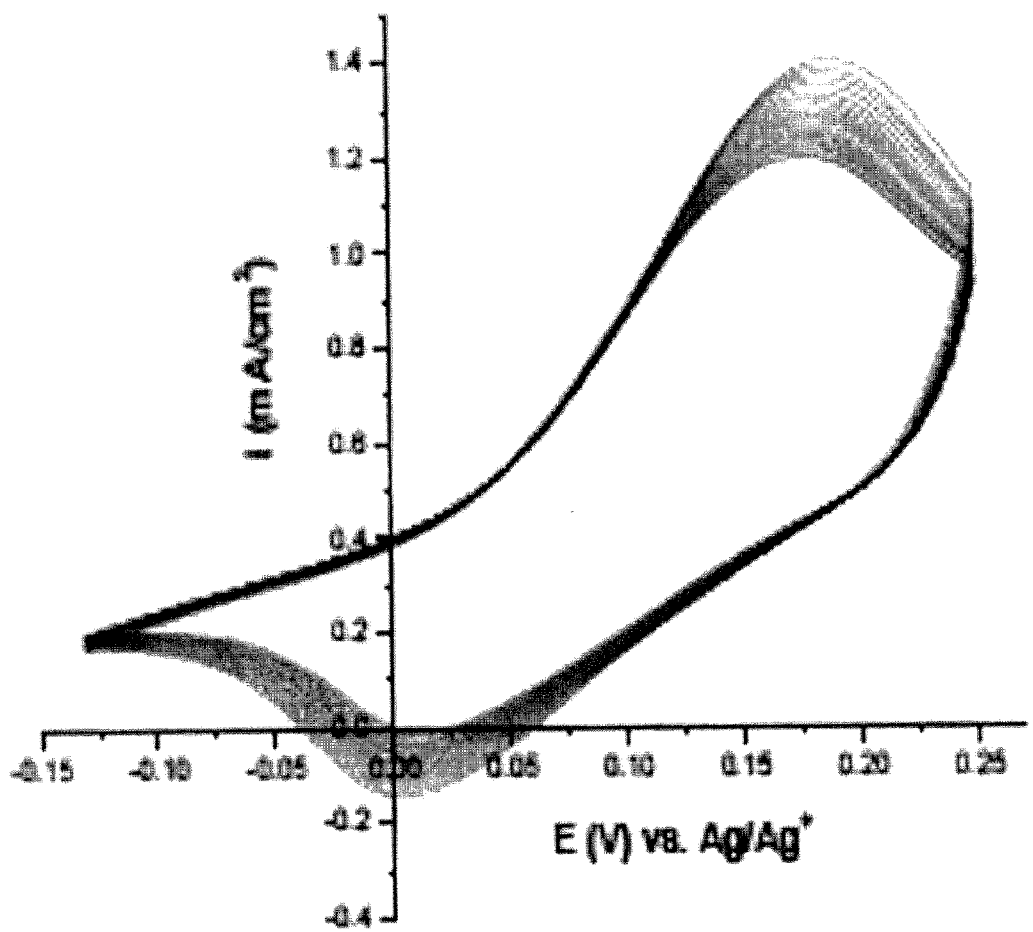

Polymeric materials comprising 3,4-dioxypyrroles possess characteristic optical and electrochemical properties, as indicated in the spectroelectrochemistry data for polymer 7a that is shown in FIG. 7. This polymeric material: is almost colorless in solution and the solid state; can be employed as a film on an ITO-coated glass or other transparent electrode; and displays almost no absorption in the visible region of the light spectrum. As shown in FIG. 7a, upon electrochemical oxidation, polymer 7a remains highly transmissive in the visible region with absorption in the near infrared region. Minimum color changing polymer, such as 7a, may be used for applications in organic electronics, such as in electrochromic devices and windows. The cyclic voltammetry on ITO, of FIG. 7b, shows that polymer 7a has a low oxidation potential (+0.18V vs. Ag/Ag+), for this electron rich polymeric system. Under conditions of the electrochemical experiment, polymer 7a delaminated from the ITO slide upon electrochemical oxidation, consistent with a high solubility of the doped polymer in the solvent, acetonitrile, that was used.

Polymers prepared according to embodiments of the invention can comprise materials that are advantageous for electrochromic windows, mirrors or displays. Additionally, these polymers can comprise materials for field effect transistors, supercapacitors, batteries, or other electronic devices. The polymers, according to embodiments of the invention, can comprise materials used in electronic paper, camouflage, anti-stat conductors, or photovoltaic devices.

Methods and Materials

All reagents and starting materials were purchased from commercial sources and used without further purification unless otherwise noted. All reactions were carried out under argon atmosphere unless otherwise noted. All $^1$H-NMR and $^{13}$C-NMR spectra were generated using a Mercury 300 or Inova 500 NMR Spectrometer. Elemental analyses were carried out by the CHN elementary analysis service in the Chemistry Department of the University of Florida. FTIR measurements were carried out using a Perkin-Elmer Spectrum One FTIR outfitted with a $LiTaO_3$ detector. Gel permeation chromatography (GPC) was performed using a Waters GPCV2000 liquid chromatography system with an internal differential refractive index detector (DRI) with two Waters Styragel HR-5E columns in series (10 μm PD, 7.8 mm i.d., 300 mm length) and a mobile phase of tetrahydrofuran (THF) with a flow rate of 1.0 mL/min, by injection of samples have a concentration of 0.05-0.08% w/v. Retention times were calibrated against narrow molecular weight polystyrene standards.

Monomer Syntheses.

Dioxypyrrole potassium salts and diacids were synthesized from their respective diesters, as previously reported in Arroyave et al., *J. Org. Chem.* 2011, 76, 8621-28.

5,5'-(3,4-(ethylene-1,2-dioxy)thiophene-2,5-diyl)bis (N-dodecyl-3,4-(propylene-1,3-dioxy)pyrrole-2-carboxylic acid) (6a)

Figure 8:
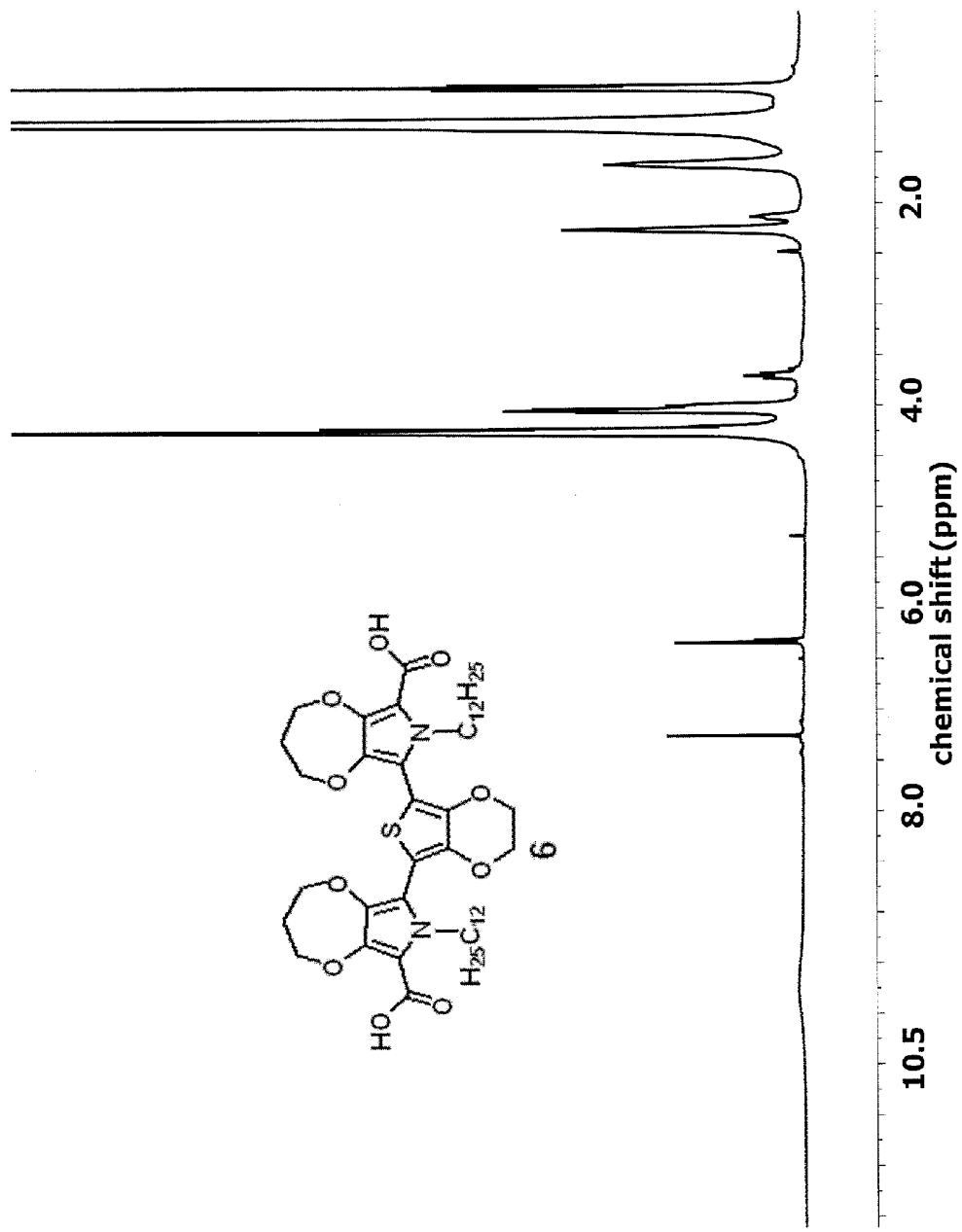
Figure 9:
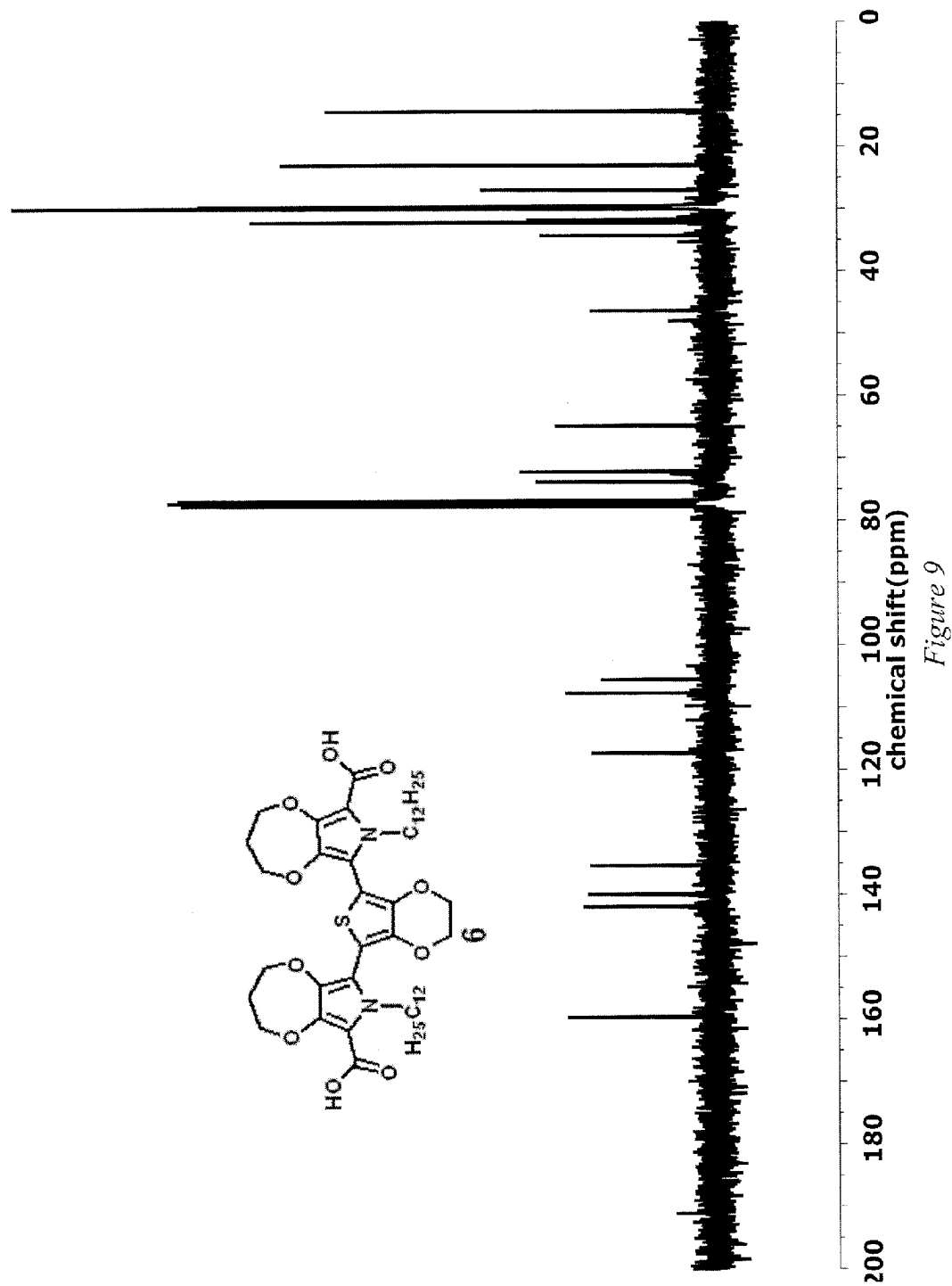

The potassium dicarboxylate 14 of 6 (0.133 g, 0.1449 mmol, 1 equiv.), 10 mL of water, and 20 mL of dichloromethane DCM were added to and shaken in a 100-mL separatory funnel. To the mixture was added 20 mL of 0.5M HCl and the mixture shaken. After separation of the layers, the DCM layer was removed. The remaining aqueous layer was combined and shaken with an additional 20 mL of DCM and 10 mL of 0.5M HCl and upon separation, the DCM layer was removed and combined with the first DCM layer. The combined DCM solution was washed three times with deionized water, and dried using sodium sulfate. The DCM was removed in vacuo, and the resulting solid was dried under vacuum for an additional two hours. The product was obtained as a mixture of diacid 6a, monoacid 6b and non-substituted dioxypyrrole oligomer 6c. The product was used without further purification. $^1$H-NMR (300 MHz, DCCl$_3$): $\delta_H$ 9.77 (br, 1.23H), 6.33 (s, 0.17H), 6.31 (s, 0.05H), 4.26 (m, 11.52H), 4.05 (m, 4.43H), 3.71 (m, 0.84H), 2.26 (m, 4H), 1.62 (m, 4.25H), 1.45-1.19 (br, m, 38.15H), 0.86 (t, 6H, J=6.14). $^{13}$C-NMR (75 MHz, DCCl$_3$): $\delta_C$ 159.7, 141.9, 139.9, 135.4, 117.3, 107.7, 105.5, 73.8, 72.2, 64.8, 46.4, 34.3, 32.1, 31.7, 29.9, 29.8, 29.6, 29.5, 26.9, 22.9, 14.3. FIGS. 8 and 9 are traces of the $^1$H-NMR spectrum and the $^{13}$C-NMR spectrum, respectively.

Polymerization Method Using N-halosuccinimides

Figure 10:
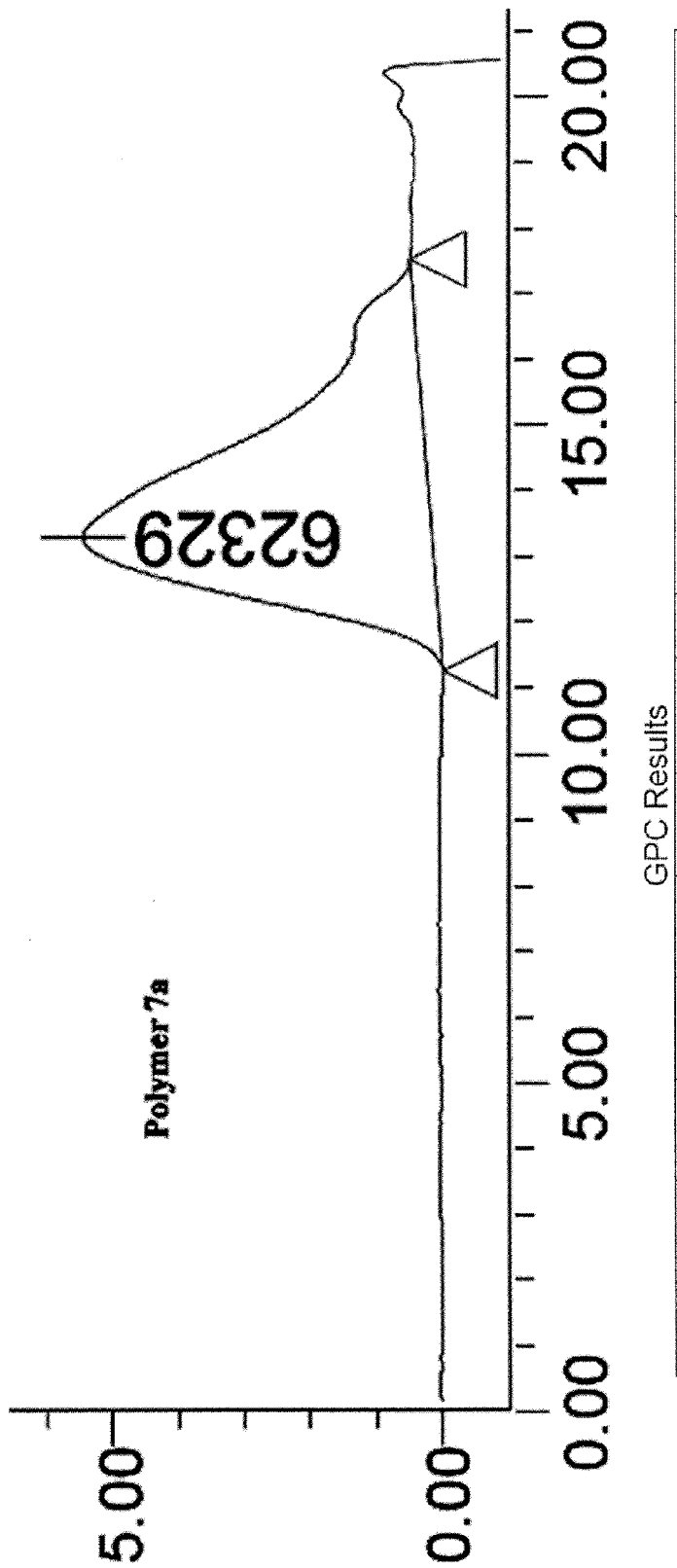
FIG. 10 shows a GPC chromatograph with tabulated data for polymer 7a, according to an embodiment of the invention.
Figure 11:
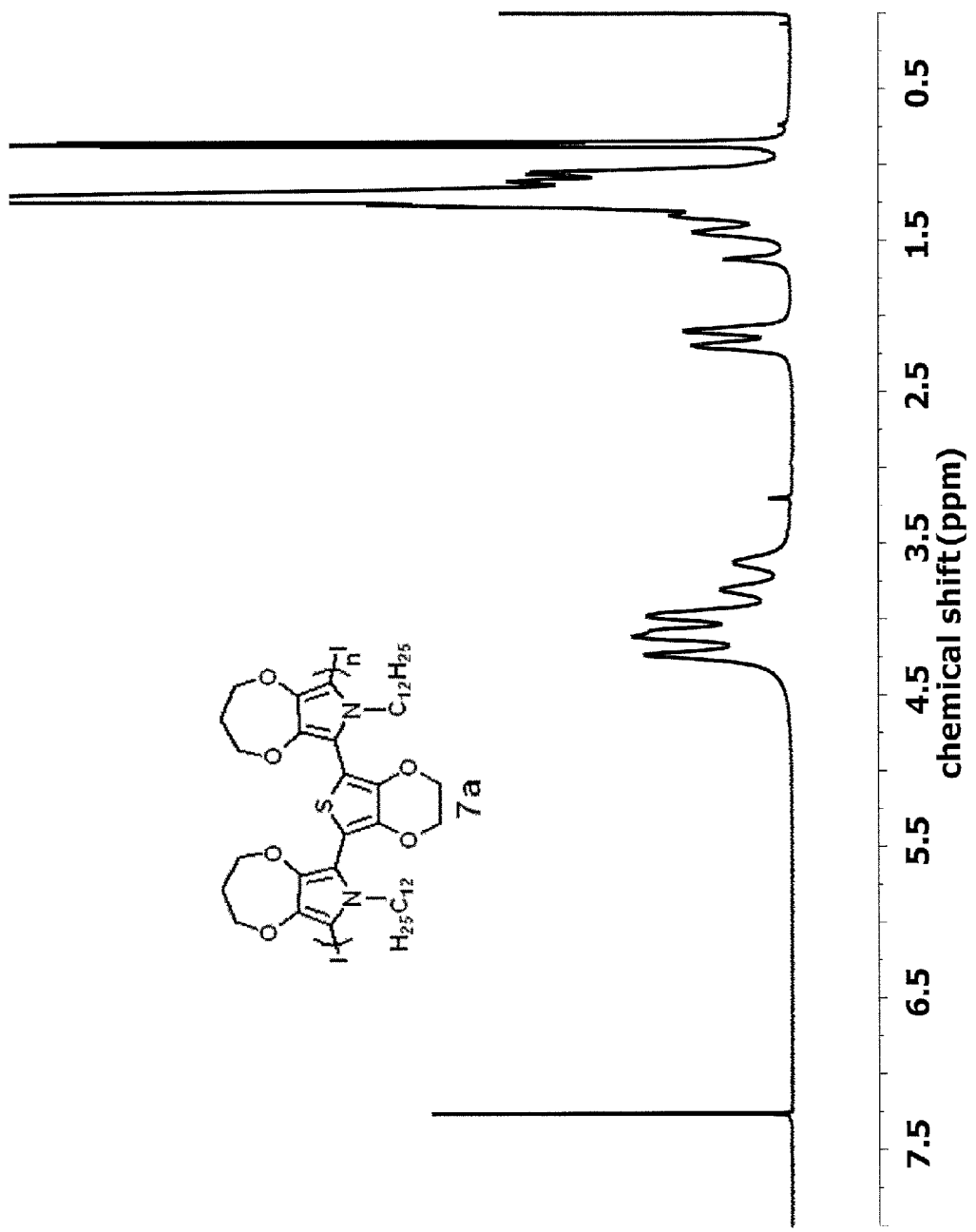
FIG. 11 shows a $^1$H-NMR spectrum of polymer 7a, according to an embodiment of the invention.
Figure 12:
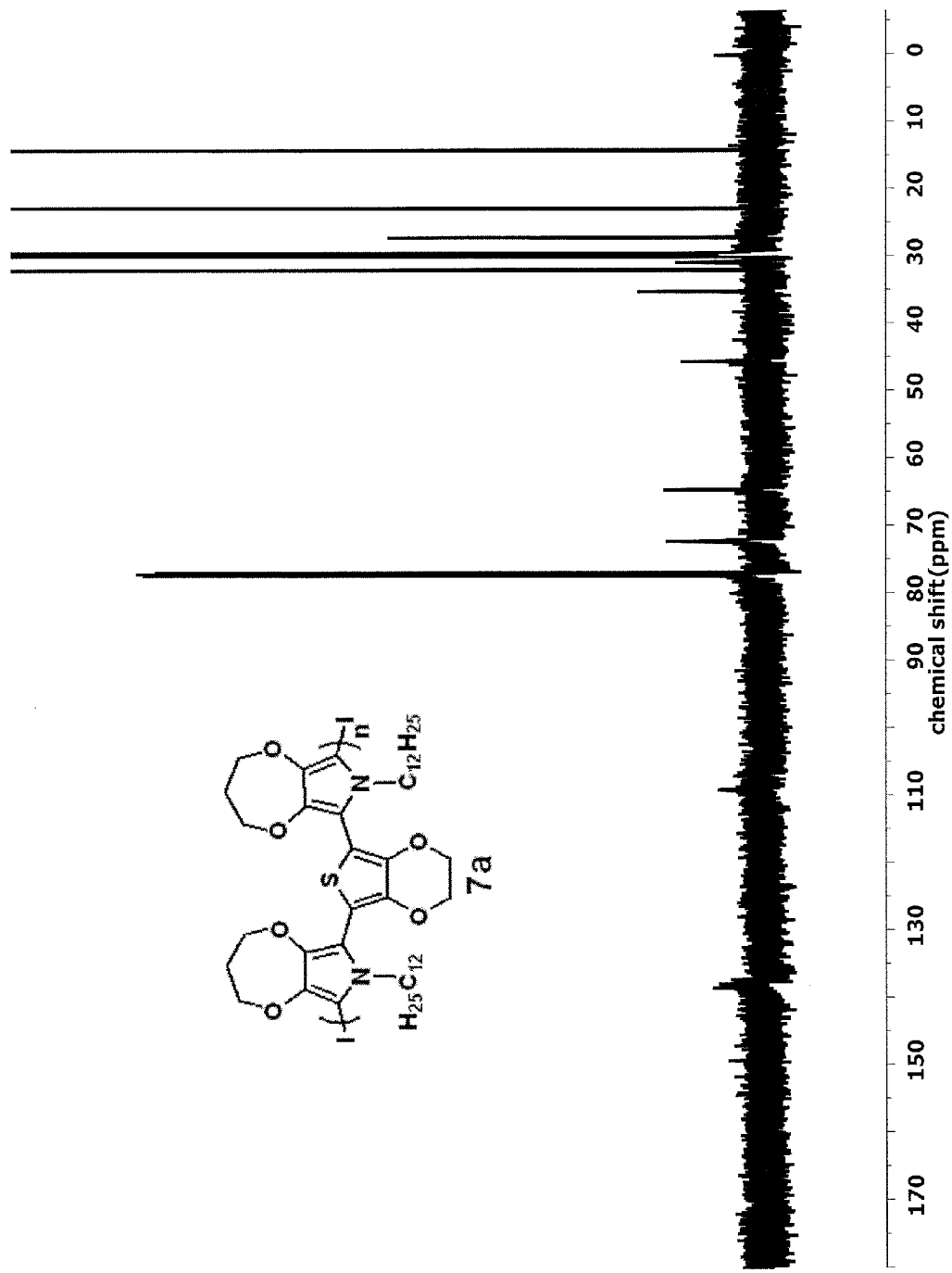
FIG. 12 shows a $^{13}$C-NMR spectrum of polymer 7a, according to an embodiment of the invention.

Poly(2,5-(5,5'-(3,4-(ethylene-1,2-dioxy)thiophene-2, 5-diyl)bis(N-dodecyl-3,4-(propylene-1,3-dioxy)pyrrole))) 7a The crude diacid 6 (0.122 g, 0.1449 mmol, 1 equiv.) and 2 mL DCM (or chloroform) were added to a 25-mL round bottom flask equipped with a stir bar and a condenser and under an argon atmosphere. The flask was cooled to –20° C., and N-iodosuccinimide (0.069 g, 0.3043 mmol, 2.1 equiv., freshly recrystallized from dioxane) was added in a single portion. The reaction mixture was stirred for 10 minutes, slowly warmed to 60° C., and stirred for 4 days. The reaction mixture was cooled to room temperature and cold hydrazine monohydrate was added with caution. The resulting mixture was poured in methanol (120 mL) and stirred for 30 minutes when the polymer precipitated. The resulting solid was collected by vacuum filtration, washed with methanol, dissolved in 2 mL of THF, and precipitated by addition to MeOH. The precipitate was filtered using a 20-μm nylon membrane filter, washed with MeOH, and dried under vacuum. A pale yellow solid, 80 mg, was recovered, 71% yield, $M_n$=7675, and $M_w$=13599. $^1$H-NMR (500 MHz, DCCl$_3$): $\delta_H$ 4.22-3.40 (m, 16H), 2.18 (s, br, 2H), 2.09 (s, br, 2H), 1.70-1.00 (m, br, 40H), 0.86 (m, 6H). $^{13}$C-NMR (125 MHz, DCCl$_3$): $\delta_C$ 138.5 (br), 137.9 (br), 137.2 (br), 112.6, 109.2 (br), 107.0, 72.3 (br), 64.7 (br), 45.7 (br), 35.3 (br), 32.2, 31.4, 31.0, 29.9 (br), 29.7, 29.6 (br), 28.9, 27.2 (br), 26.9, 26.8, 22.9, 14.3. Elemental Analysis calculated for C$_{44}$H$_{66}$N$_2$O$_6$S: C (70.36%), H (8.86%), N (3.73%). Found: C (70.32%), H (8.96%), N (3.52%). FIGS. 10, 11, and 12 are traces of the GPC chromatograph, $^1$H-NMR spectrum, and $^{13}$C-NMR spectrum, respectively.

Poly(2,5-(5,5'-(3,4-(ethylene-1,2-dioxy)thiophene-2, 5-diyl)bis(N-dodecyl-3,4-(propylene-1,3-dioxy)pyrrole))) 7b The reaction was carried out using the same procedure for polymer 7a, above, where an equivalent molar quantity of N-bromosuccinimide was substituted for N-iodosuccinimide. A pale yellow solid was recovered in 83% yield. $M_n$=6300, $M_w$=8898. $^1$H-NMR (500 MHz, DCCl$_3$): $\delta_H$ 4.22-3.40 (m, 16H), 2.18 (s, br, 2H), 2.09 (s, br, 2H), 1.70-1.00 (m, br, 40H), 0.86 (m, 6H). $^{13}$C-NMR (125 MHz, DCCl$_3$): 138.5 (br), 137.9 (br), 115.9 (br), 109.0 (br), 72.3, 64.7, 45.7, 35.3, 32.2, 31.0, 30.5, 29.9, 29.6, 29.2, 29.1, 28.9, 27.2, 27.1, 27.0, 22.9, 14.3.

Poly(2,5-(5,5'-(3,4-(ethylene-1,2-dioxy)thiophene-2, 5-diyl)bis(N-dodecyl-3,4-(propylene-1,3-dioxy)pyrrole))) 7c The reaction was carried out using the same procedure for polymer 7a, above, where an equivalent molar quantity of N-bromosuccinimide was substituted for N-chlorosuccinimide. A pale yellow solid was recovered in 39% yield. $M_n$=4978, $M_w$=6291. $^1$H-NMR (500 MHz, DCCl$_3$): $\delta_H$ 4.22-3.40 (m, 16H), 2.18 (s, br, 2H), 2.09 (s, br, 2H), 1.70-1.00 (m, br, 40H), 0.86 (m, 6H). $^{13}$C-NMR (125 MHz, DCCl$_3$): 138.3 (br), 137.9 (br), 137.2 (br), 119.8 (br), 109.1 (br), 109.0 (br), 72.3, 64.7, 45.7, 35.3, 32.2, 31.0, 30.7, 29.9, 29.7, 29.6, 29.1, 29.0, 27.3, 22.9, 14.3.

Poly(N-dodecyl-3,4-(propylene-1,3-dioxy)pyrrole)) 16a using N-iodosuccinimide

Reaction and isolation were carried out using the same procedures for polymer 7a, above, with a 60% yield. $M_n$=13980, $M_w$=16781. $^1$H-NMR (500 MHz, DCCl$_3$): $\delta_H$ 4.38-3.20 (m, br, 6H), 2.15 (s, br, 2H), 1.74-0.95 (m, br, 20H), 0.86 (s, br, 3H). $^{13}$C-NMR (125 MHz, DCCl$_3$): 139.0, 109.1, 72.2, 46.1, 35.3, 32.2, 30.8, 30.1, 30.0, 29.9, 29.7, 29.6, 27.1, 22.9, 14.3. Elemental Analysis calculated for C$_{19}$H$_{31}$NO$_2$: C (74.71%) H (10.63%) N (4.21%). Found: C (74.58%), H (10.73%), N (4.34%).

Poly(N—H-3,4-(di-2-ethylhexoxypyrrole)) 20 using N-iodosuccinimide

Reaction was carried out using the same procedure for polymer 7a, above, and isolation involved: reduction with cold hydrazine monohydrate and addition of the reaction mixture dropwise to 75 mL of MeOH in an Erlenmeyer flask. The mixture was stirred for 20 minutes, and decanted. A sticky oil that remained in the Erlenmeyer flask was washed with 40 mL of MeOH, dissolved using THF, the solution transferred to a vial, the solvent removed in vacuo, and the product stored under argon. The product was received as a brown-black sticky solid, 31% yield. $M_n$=3646, $M_w$=5222. $^1$H-NMR (500 MHz, DCCl$_3$): $\delta_H$ 9.68-8.60 (s, br, 1H), 4.37-3.57 (m, 4H), 2.04-1.09 (m, 18), 0.84 (m, 12). $^{13}$C-NMR (125 MHz, DCCl$_3$): $\delta_C$ 131.1, 129.0, 40.3, 30.4, 29.2, 23.6 (br), 23.3, 14.3, 11.0. FTIR (NaCl, disc) $^\nu$ (cm$^{-1}$): 3436.8 (w), 2958.0 (s), 2929.6 (s), 2873.6 (s), 2856.5 (s), 1717.5 (w), 1605.4 (m, br), 1464.4 (s, br), 1379.2 (s), 1343.8 (m), 1194.7 (m), 1112.1 (s), 1051.0 (s), 772.1 (w), 728.0 (w).

General Polymerization Method Using Iodine

Poly(N-dodecyl-3,4-(propylene-1,3-dioxy)pyrrole)) 16a

Figure 13:
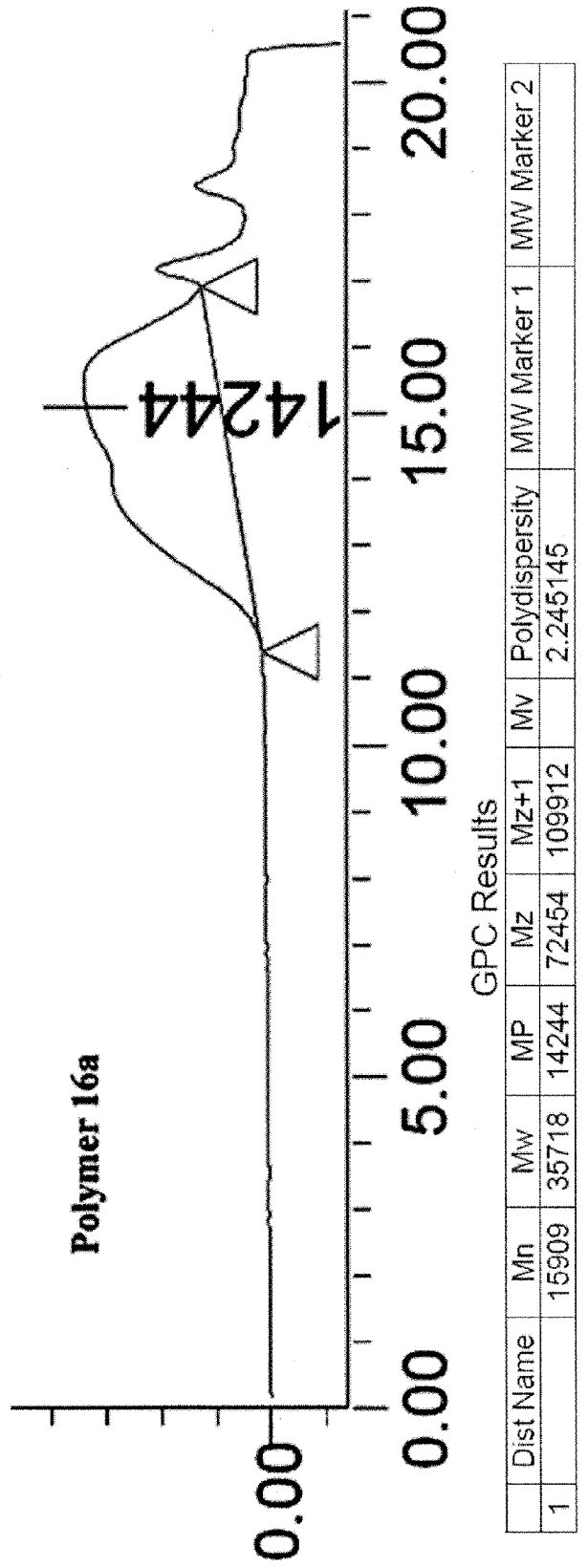
FIG. 13 shows a GPC chromatograph with tabulated data for polymer 16a, prepared according to an embodiment of the invention.
Figure 14:
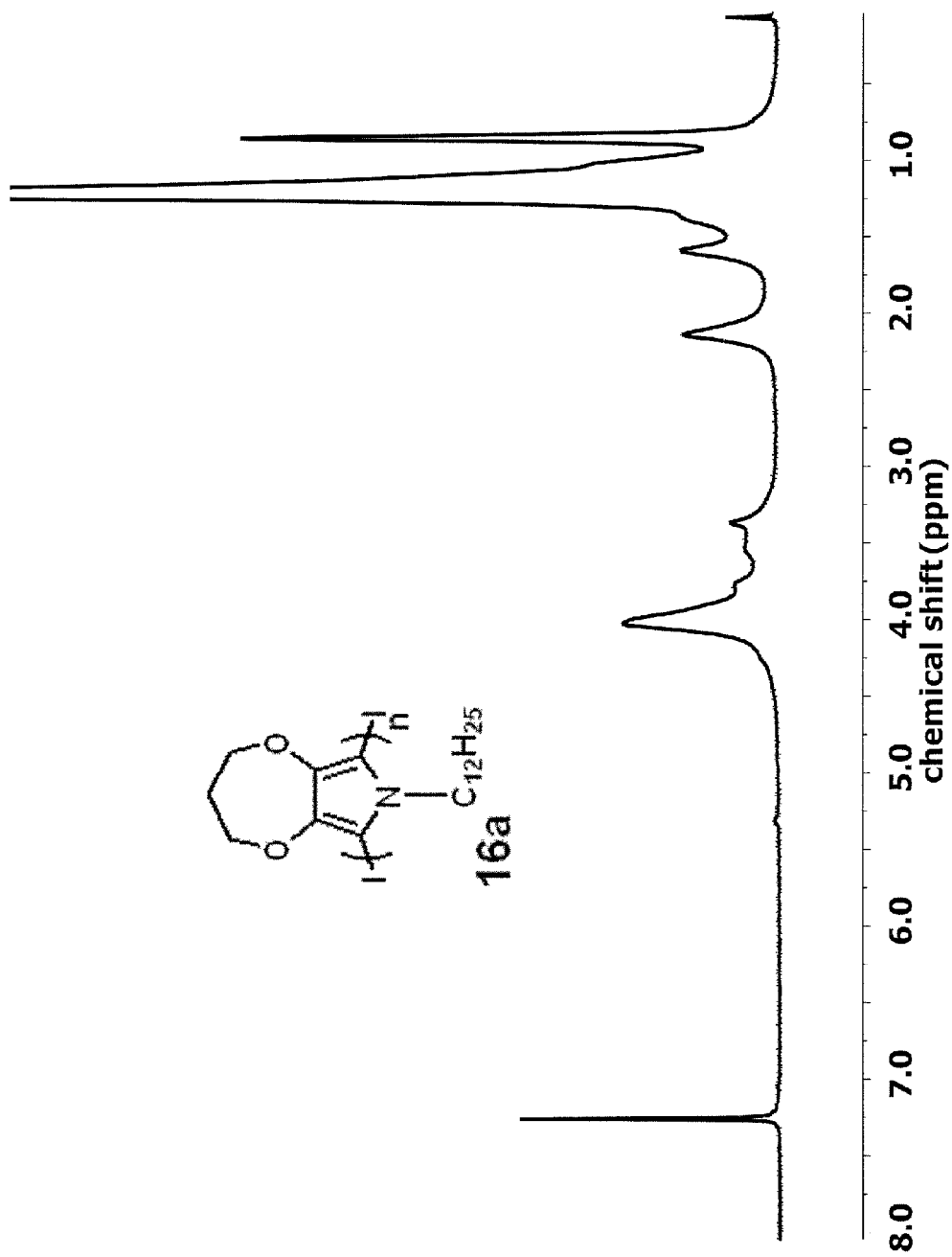
FIG. 14 shows a $^1$H-NMR spectrum of polymer 16a, prepared according to an embodiment of the invention.
Figure 15:
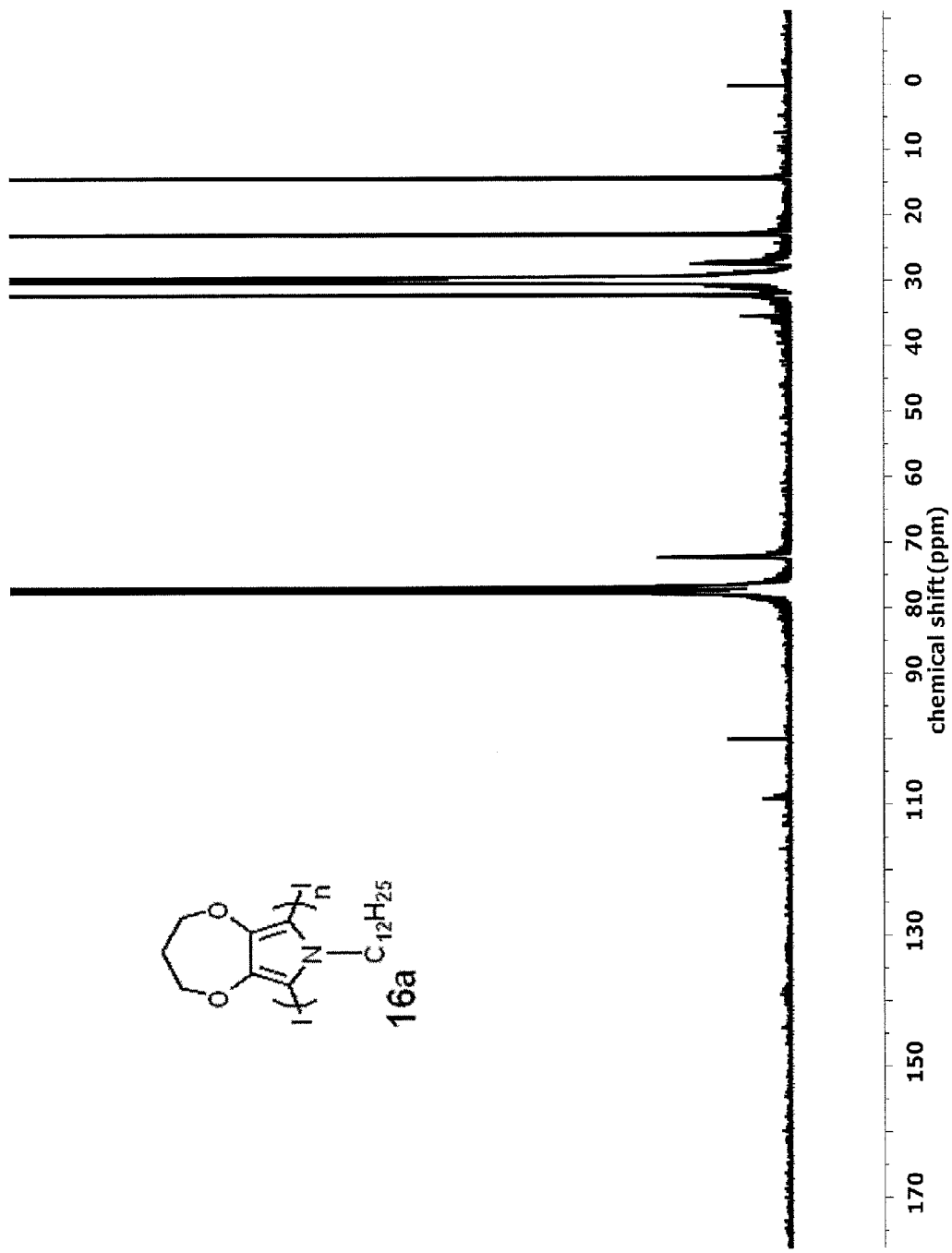
FIG. 15 shows a $^{13}$C-NMR spectrum of polymer 16a, prepared according to an embodiment of the invention.

ProDOP potassium salt 17 (0.200 g, 0.4240 mmol, 1.0 equiv.), iodine (0.226 g, 0.8905 mmol, 2.0 equiv), and 2 mL of DCM were added to a 25-mL round bottom flask equipped with a stir bar and a condenser under an argon atmosphere. The reaction mixture was stirred at room temperature for 10 minutes and 2 mL of deionized water was added. The reaction was warmed to 60° C., and stirred for 48 hours. The reaction mixture was allowed to cool to room temperature and reduced by careful addition of 2 mL of cold hydrazine monohydrate. The crude mixture was added to 75 mL of methanol and stirred for 15 minutes and the polymer precipitated. The resulting solid was collected by filtration using a 20 μm nylon membrane, dissolved in 2 mL of THF, and precipitated in 75 mL of MeOH. The solid was collected by filtration using a 20 μm nylon membrane and subjected to Soxhlet extraction using MeOH for 16 hours. The resulting solid was dissolved with dichloromethane and reduced dropwise with hydrazine monohydrate if the solution became dark. The solution was concentrated to approximately 2 mL and precipitated into 50 mL of methanol. The resulting solid was collected by filtration using a 20 μm nylon membrane and dried under vacuum. The product was isolated as a pale yellow solid, 0.072 g, 55% yield. $M_n$=15909, and $M_w$=35718. $^1$H-NMR (500 MHz, DCCl$_3$): $\delta_H$ 4.30-3.20 (m, br, 6H), 2.14 (s, br, 2H), 1.70-0.90 (m, br, 20H), 0.85 (s, br, 3H). $^{13}$C-NMR (125 MHz, DCCl$_3$): $\delta_C$ 138.3 (br), 109.1 (br), 108.6 (br), 72.2, 72.1, 45.7, 35.4, 32.2, 31.3, 30.8, 30.0, 29.6, 27.4, 27.1, 22.9, 14.3. Elemental Analysis calculated for C$_{19}$H$_{31}$NO$_2$: C (74.71%) H (10.63%) N (4.21%). Found: C (74.71%), H (10.23%), N (4.59%). FIGS. 13, 14, and 15 are traces of the GPC chromatograph, $^1$H-NMR spectrum, and $^{13}$C-NMR spectrum, respectively.

Poly(2,5-(5,5'-(3,4-(ethylene-1,2-dioxy)thiophene-2,5-diyl)bis(N-dodecyl-3,4-(propylene-1,3-dioxy)pyrrole))) 7a Reaction was carried out using the same procedure for polymer 16a, above, resulting in a 66% yield. $M_n$=22875, $M_w$=58099. $^1$H-NMR (500 MHz, DCCl$_3$): $\delta_H$ 4.5-3.48 (m, br, 16H), 2.19 (s, br, 2H), 2.09 (s, br, 2H), 1.68-1.00 (m, br, 40), 0.86 (t, 6H, J=6.9 Hz). $^{13}$C-NMR (125 MHz, DCCl$_3$): $\delta$C 131.1, 129.0, 40.3, 30.4, 29.2, 23.6 (br), 23.3, 14.3, 11.0.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:
1. A method for the preparation of a polymer comprising:
providing a plurality of monomers and/or oligomers of the structure:

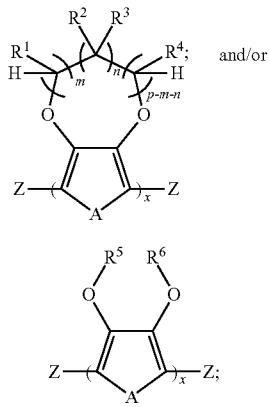

where: x is 1 to 10; $R^1$, $R^2$, $R^3$, and $R^4$ are independently hydrogen, methyl, ethyl, C$_3$ through C$_{20}$ straight or branched chain alkyl, aryl, or alkylaryl; $R^5$ and $R^6$ are independently methyl, ethyl, C$_3$ through C20 straight or branched chain alkyl, aryl, or alkylaryl; p is 2 through 6, m is 1 through p−1, n is 0 through p−2; when x is 1, Z is H or C(O)OR7 or when x is >1, Z is H, chlorine, bromine, iodine, or C(O)OR7, where R7 is hydrogen, lithium, sodium, potassium, cesium, or ammonium where 1 to 4 of the bonds to N is to H, C$_1$ to C$_8$ alkyl, aryl, or alkyl aryl groups; and A is O or NR, where R is hydrogen, methyl, ethyl, C$_3$ through C$_{20}$ straight or branched chain alkyl, aryl, alkylaryl, or CH$_2$X wherein X is C(O)R$^8$, CH$_2$YR$^9$, or CR$^{10}$=CR$^{11}$R$^{12}$, where R$^8$ is hydrogen, methyl, ethyl, C$_3$ through C$_{20}$ straight or branched chain alkyl, aryl, OR$^{13}$, or NR$^{14}$R$^{15}$, where R$^{13}$, R$^{14}$, and R$^{15}$, are independently hydrogen, methyl, ethyl, C$_3$ through C$_{20}$ straight or branched chain alkyl, aryl or alkylaryl, wherein Y is O, OC(O), NR$^{16}$, or NR$^{17}$C(O), and where R$^9$, R$^{10}$, R$^{11}$, R$^{12}$, R$^{16}$, and R$^{17}$ are independently hydrogen, methyl, ethyl, C$_3$ through C$_8$ straight or branched chain alkyl, aryl, or alkylaryl;
combining at least two equivalents of a halogen, N-haloimide, or N-haloamine with every mole of the monomers and/or oligomers; and
polymerizing or copolymerizing the monomers and/or oligomers to form a conjugated polymer.
2. The method of claim 1, wherein the conjugated polymer is a homopolymer from the monomer of structure I or II, wherein x is 1, A is NR, and Z is C(O)OR$^7$.
3. The method of claim 1, wherein the conjugated polymer is a copolymer from a plurality of the monomers of structures I and/or II, wherein x is 1, A is NR, and Z is C(O)OR$^7$.
4. The method of claim 1, wherein the conjugated polymer comprises halogen end-groups from the halogen, N-haloimide or N-haloamine.
5. The method of claim 1, further comprising an end-capping monomer of the structure:

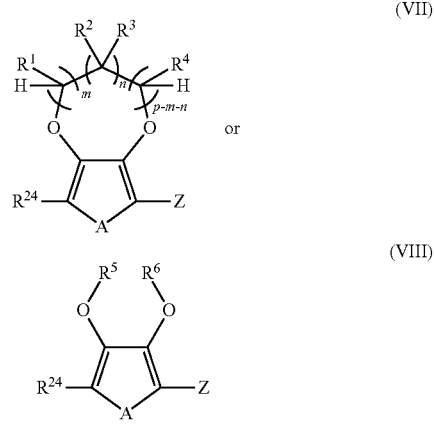

where R$^1$, R$^2$, R$^3$, and R$^4$ are independently hydrogen, methyl, ethyl, C$_3$ through C$_{20}$ straight or branched chain alkyl, aryl, or alkylaryl; R$^5$ and R$^6$ are independently methyl, ethyl, C$_3$ through C$_{20}$ straight or branched chain alkyl, aryl, or alkylaryl; p is 2 through 6, m is 1 through p−1, n is 0 through p−2; Z is H, chlorine, bromine, iodine, or C(O)OR$^7$ where R$^7$ is hydrogen, lithium, sodium, potassium, cesium, or ammonium where 1 to 4 of the bonds to N is H, C$_1$ to C$_8$ alkyl, aryl, or alkyl aryl groups; A is O or NR, wherein R is hydrogen, methyl, ethyl, C$_3$ through C$_{20}$ straight or branched chain alkyl, aryl, alkylaryl, or CH$_2$X wherein X is C(O)R$^8$, CH$_2$YR$^9$, or CR$^{10}$=CR$^{11}$R$^{12}$, where R$^8$ is hydrogen, methyl, ethyl, C$_3$ through C$_{20}$ straight or branched chain alkyl, aryl, OR$^{13}$, or NR$^{14}$R$^{15}$, where R$^{13}$, R$^{14}$, and R$^{15}$, are independently hydrogen, methyl, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl; and $R^{24}$ is alkyl, aryl, alkylaryl, aryl, functional alkyl, functional aryl, or functional alkylaryl group, wherein the functional alkyl, the functional aryl, or the functional alkylaryl group comprises one or more functional groups selected from amines, acrylates, hydroxys, esters, carboxylic acid, thiols, enes, dienes, ynes, and halides.

6. The method of claim 1, further comprising providing an acid.

7. The method of claim 1, further comprising irradiating with ultraviolet light.

8. The method of claim 1, further comprising providing a solvent.

9. The method of claim 1, wherein polymerizing or copolymerizing is carried out under an inert atmosphere or under air.

10. The method of claim 1, wherein polymerizing or copolymerizing is carried out at 0 to 100° C.

11. A method for the preparation of a polymer comprising: providing a plurality of monomers and/or oligomers of the structure:

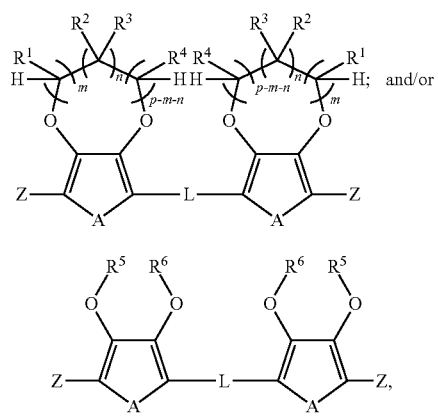

where: $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; Z is H, chlorine, bromine, iodine, or $C(O)OR^7$, where $R^7$ is hydrogen, lithium, sodium, potassium, cesium, or ammonium where 1 to 4 of the bonds to N is to H, $C_1$ to $C_8$ alkyl, aryl, or alkyl aryl groups; A is O or NR, where R is hydrogen, methyl, ethyl, $C_3$ through $C_{20}$ straight or branched chain alkyl, aryl, alkylaryl, or $CH_2X$ wherein X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl; and L comprises an unsubstituted or substituted 1,2-ethenediyl, 1,4-butadienediyl, 1,4-benzenediyl, 2,6-naphthalendiyl, 9,10-anthracenediyl, 2,7-fluorenediyl, 2,5-furandiyl, 2,5-thiophenediyl, 2,5-pyrroldiyl, 2,1,3-benzothiadiazole-4,7-diyl, 2,7-carbazolediyl, 2,6-pyridinediyl, 1,4-bis(2',2''-thiophenyl)benzene-5',5''-diyl, or 4,7-bis-(2',2''thiophenyl)-2,1,3-benzothiadiazole-5',5''-diyl;

combining at least two equivalents of a halogen, N-haloimide, or N-haloamine with every mole of the monomers and/or oligomers; and polymerizing or copolymerizing the monomers and/or oligomers to form a conjugated polymer.

12. The method of claim 11, wherein L is the substituted 2,5-thiophenediyl of the structure:

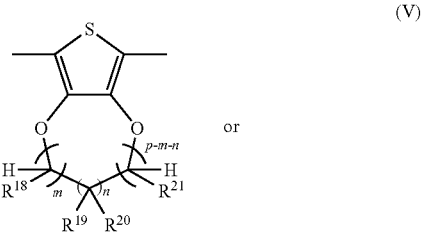

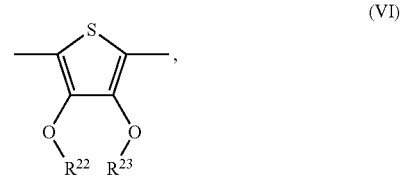

where p is 2 through 6, m is 1 through p−1, n is 0 through p−2 and $R^{18}$, $R^{19}$, $R^{20}$, and $R^{21}$ are independently hydrogen, methyl, ethyl, $C_3$ through $C_{20}$ straight or branched chain alkyl, aryl, or alkylaryl; and $R^{22}$ and $R^{23}$ are independently methyl, ethyl, $C_3$ through $C_{20}$ straight or branched chain alkyl, aryl, or alkylaryl.

13. The method of claim 11, wherein the conjugated polymer is a homopolymer or a copolymer from the monomer of structure III or IV, wherein A is NR and Z is $C(O)OR^7$.

14. The method of claim 11, wherein the conjugated polymer is a copolymer from a plurality of the monomers of structures III and IV, wherein A is NR, and Z is $C(O)OR^7$.

15. The method of claim 11, wherein the conjugated polymer comprises halogen end-groups of the halogen, N-haloimide or N-haloamine.

16. The method of claim 11, further comprising an end-capping monomer of the structure:

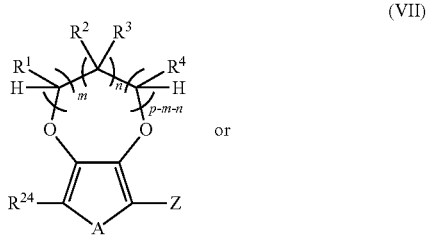

-continued

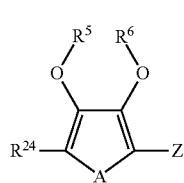
(VIII)

where $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; Z is H, chlorine, bromine, iodine, or $C(O)OR^7$ where $R^7$ is hydrogen, lithium, sodium, potassium, cesium, or ammonium where 1 to 4 of the bonds to N is H, $C_1$ to $C_8$ alkyl, aryl, or alkyl aryl groups; A is O or NR, wherein R is hydrogen, methyl, ethyl, $C_3$ through $C_{20}$ straight or branched chain alkyl, aryl, alkylaryl, or $CH_2X$ wherein X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl; and $R^{24}$ is alkyl, aryl, alkylaryl, aryl, functional alkyl, functional aryl, or functional alkylaryl group, wherein the functional alkyl, the functional aryl, or the functional alkylaryl group comprises one or more functional groups selected from amines, acrylates, hydroxys, esters, carboxylic acid, thiols, enes, dienes, ynes, and halides polymerizing or copolymerizing the monomers and/or oligomers to form a conjugated polymer.

17. The method of claim 11, further comprising providing an acid.

18. The method of claim 11, further comprising irradiating with ultraviolet light.

19. The method of claim 11, further comprising providing a solvent.

20. The method of claim 11, wherein polymerizing or copolymerizing is carried out under an inert atmosphere or under air.

21. The method of claim 11, wherein polymerizing or copolymerizing is carried out at 0 to 100° C.

22. The method of claim 11, wherein the plurality of monomers and/or oligomers of the structure further comprises:

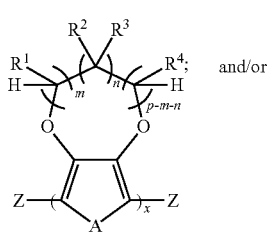
(I)
and/or

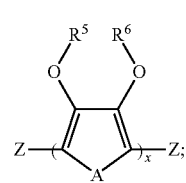
(II)

where: x is 1 to 10; $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; Z is H or C(O) $OR^7$, where $R^7$ is hydrogen, lithium, sodium, potassium, cesium, or ammonium where 1 to 4 of the bonds to N is to H, $C_1$ to $C_8$ alkyl, aryl, or alkyl aryl groups; and A is O or NR, where R is hydrogen, methyl, ethyl, $C_3$ through $C_{20}$ straight or branched chain alkyl, aryl, alkylaryl, or $CH_2X$ wherein X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methyl, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl.

23. The method of claim 22, further comprising an end-capping monomer of the structure:

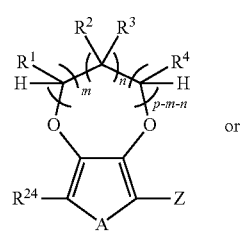
(VII)

or

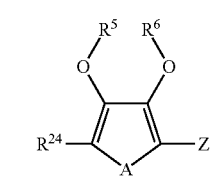
(VIII)

where $R^1$, $R^2$, $R^3$, and $R^4$ are independently hydrogen, methyl, ethyl, $C_3$ through $C_{20}$ straight or branched chain alkyl, aryl, or alkylaryl; $R^5$ and $R^6$ are independently methyl, ethyl, $C_3$ through $C_{20}$ straight or branched chain alkyl, aryl, or alkylaryl; p is 2 through 6, m is 1 through p−1, n is 0 through p−2; Z is H, chlorine, bromine, iodine, or $C(O)OR^7$ where $R^7$ is hydrogen, lithium, sodium, potassium, cesium, or ammonium where 1 to 4 of the bonds to N is H, $C_1$ to $C_8$ alkyl, aryl, or alkyl aryl groups; A is O or NR, wherein R is hydrogen, methyl, ethyl, $C_3$ through $C_{20}$ straight or branched chain alkyl, aryl, alkylaryl, or $CH_2X$ wherein X is $C(O)R^8$, $CH_2YR^9$, or $CR^{10}=CR^{11}R^{12}$, where $R^8$ is hydrogen, methyl, ethyl, $C_3$ through $C_{20}$ straight or branched chain alkyl, aryl, $OR^{13}$, or $NR^{14}R^{15}$, where $R^{13}$, $R^{14}$, and $R^{15}$, are independently hydrogen, methy, ethyl, $C_3$ through $C_{20}$ straight or branched chain alkyl, aryl or alkylaryl, wherein Y is O, OC(O), $NR^{16}$, or $NR^{17}C(O)$, and where $R^9$, $R^{10}$, $R^{11}$, $R^{12}$, $R^{16}$, and $R^{17}$ are independently hydrogen, methyl, ethyl, $C_3$ through $C_8$ straight or branched chain alkyl, aryl, or alkylaryl; and $R^{24}$ is alkyl, aryl, alkylaryl, aryl, functional alkyl, functional aryl, or functional alkylaryl group, wherein the functional alkyl, the functional aryl, or the functional alkylaryl group comprises one or more functional groups selected from amines, acrylates, hydroxys, esters, carboxylic acid, thiols, enes, dienes, ynes, and halides.

* * * * *

UNITED STATES PATENT AND TRADEMARK OFFICE
CERTIFICATE OF CORRECTION

PATENT NO. : 9,012,600 B2  
APPLICATION NO. : 13/765810  
DATED : April 21, 2015  
INVENTOR(S) : John R. Reynolds et al.

Page 1 of 1

It is certified that error appears in the above-identified patent and that said Letters Patent is hereby corrected as shown below:

In the Specification

<u>Column 13,</u>
Line 11, "m, 38.15H)" should read --m, ~38.15H)--.

Signed and Sealed this
Tenth Day of November, 2015

Michelle K. Lee
*Director of the United States Patent and Trademark Office*